US012507222B2

(12) United States Patent
Takeda et al.

(10) Patent No.: US 12,507,222 B2
(45) Date of Patent: Dec. 23, 2025

(54) JOINT INDICATION FOR MULTI-CELL SCHEDULING

(71) Applicant: QUALCOMM Incorporated, San Diego, CA (US)

(72) Inventors: Kazuki Takeda, Tokyo (JP); Mostafa Khoshnevisan, San Diego, CA (US); Huilin Xu, Temecula, CA (US)

(73) Assignee: Qualcomm Incorporated, San Diego, CA (US)

( * ) Notice: Subject to any disclaimer, the term of this patent is extended or adjusted under 35 U.S.C. 154(b) by 398 days.

(21) Appl. No.: 17/719,305

(22) Filed: Apr. 12, 2022

(65) Prior Publication Data

US 2023/0328702 A1 Oct. 12, 2023

(51) Int. Cl.
*H04W 72/0453* (2023.01)
*H04W 72/23* (2023.01)

(52) U.S. Cl.
CPC ....... *H04W 72/0453* (2013.01); *H04W 72/23* (2023.01)

(58) Field of Classification Search
CPC . H04W 72/0453; H04W 72/23; H04W 76/10; H04L 5/00
See application file for complete search history.

(56) References Cited

U.S. PATENT DOCUMENTS

| 2018/0069589 | A1* | 3/2018 | Liu | H04W 16/14 |
| 2019/0268206 | A1* | 8/2019 | Yang | H04L 5/0051 |
| 2019/0313321 | A1* | 10/2019 | Xu | H04L 5/0053 |
| 2019/0342868 | A1* | 11/2019 | Lee | H04W 76/27 |
| 2019/0373588 | A1* | 12/2019 | Bae | H04L 5/0044 |
| 2020/0053758 | A1* | 2/2020 | Hosseini | H04L 5/1469 |
| 2020/0112484 | A1* | 4/2020 | Sun | H04L 5/003 |
| 2020/0275430 | A1* | 8/2020 | Salem | H04L 1/1614 |
| 2020/0314749 | A1* | 10/2020 | Sarkis | H04L 5/0092 |
| 2021/0058940 | A1* | 2/2021 | Choi | H04W 72/04 |
| 2021/0185712 | A1* | 6/2021 | Matsumura | H04L 1/1854 |
| 2021/0274535 | A1* | 9/2021 | Yi | H04W 72/0446 |
| 2021/0321443 | A1 | 10/2021 | Takeda et al. | |
| 2021/0336688 | A1* | 10/2021 | Lee | H04W 4/40 |
| 2022/0046522 | A1* | 2/2022 | Kim | H04W 52/365 |

(Continued)

OTHER PUBLICATIONS

International Search Report and Written Opinion—PCT/US2023/065305—ISA/EPO—Jul. 13, 2023.

*Primary Examiner* — Hassan A Phillips
*Assistant Examiner* — Prenell P Jones
(74) *Attorney, Agent, or Firm* — Holland & Hart LLP

(57) ABSTRACT

Methods, systems, and devices for wireless communications are described. A user equipment (UE) may receive from a network entity a message indicating one or more sets of parameters for a set of carriers supported by the UE, the one or more sets of parameters indicating communication parameters for communications via the set of carriers. The UE may monitor for a field of a control message based on the message. A field size of the field may be based on the sets of parameters, and a respective value for the field may indicate a respective set of parameters of the sets of parameters for one or more carriers of the set of carriers. Based on receiving a control message and decoding the associated field, the UE may communicate via at least one carrier of the set of carriers using the respective set of parameters for the at least one carrier.

30 Claims, 18 Drawing Sheets

(56) References Cited

U.S. PATENT DOCUMENTS

| | | | | |
|---|---|---|---|---|
| 2022/0278807 A1* | 9/2022 | Zhang | .................... | H04L 1/1864 |
| 2022/0399983 A1* | 12/2022 | Muruganathan | ...... | H04L 5/0098 |
| 2022/0408458 A1* | 12/2022 | MolavianJazi | ... | H04W 72/1263 |
| 2022/0408464 A1* | 12/2022 | MolavianJazi | ... | H04W 72/0453 |
| 2023/0034421 A1* | 2/2023 | Zhang | ...................... | H04L 5/16 |
| 2023/0045905 A1* | 2/2023 | Lim | ........................ | H04W 8/24 |
| 2023/0083277 A1* | 3/2023 | Lee | ........................ | H04W 72/56 |
| | | | | 370/329 |
| 2023/0129120 A1* | 4/2023 | MolavianJazi | ....... | H04L 1/1887 |
| | | | | 370/329 |
| 2023/0171688 A1* | 6/2023 | Xu | .................... | H04W 52/0206 |
| | | | | 370/311 |
| 2023/0319822 A1* | 10/2023 | Park | ...................... | H04L 1/0003 |
| | | | | 370/329 |
| 2023/0354364 A1* | 11/2023 | Guo | .................. | H04W 52/0229 |

* cited by examiner

| Field Value 305-a | Carrier 310-a | Carrier 310-b | Carrier 310-c | Carrier 310-d |
|---|---|---|---|---|
| 00 | Param. 315-a | Param. 315-e | Param. 315-g | Param. 315-h |
| 01 | Param. 315-b | Param. 315-f |  | Param. 315-i |
| 10 | Param. 315-c |  |  | Param. 315-j |
| 11 | Param. 315-d |  |  | Param. 315-k |

FIG. 3A 300-a

| Field Value 305-b | Carrier 310-a | Carrier 310-b | Carrier 310-c | Carrier 310-d |
|---|---|---|---|---|
| 00 | BWP 320-a | BWP 320-e | BWP 320-g | BWP 320-h |
| 01 | BWP 320-b | BWP 320-f | BWP 320-g | BWP 320-i |
| 10 | BWP 320-c | BWP 320-e | BWP 320-g | BWP 320-j |
| 11 | BWP 320-d | BWP 320-f | BWP 320-g | BWP 320-k |

300-b

| Field Value 305-c | Carrier 310-a | Carrier 310-b |
|---|---|---|
| 000 | TDRA 325-a | TDRA 325-h |
| 001 | TDRA 325-b | TDRA 325-i |
| 010 | TDRA 325-c | TDRA 325-j |
| 011 | TDRA 325-d | TDRA 325-h |
| 100 | TDRA 325-e | TDRA 325-i |
| 101 | TDRA 325-f | TDRA 325-j |
| 110 | TDRA 325-g | TDRA 325-h |
| 111 | TDRA 325-a | TDRA 325-i |

| Field Value 305-d | Carrier 310-a | Carrier 310-b | Carrier 310-c | Carrier 310-d |
|---|---|---|---|---|
| 00 | BWP 320-a | BWP 320-e | BWP 320-g | BWP 320-h |
| 01 | BWP 320-b | BWP 320-f |  | BWP 320-i |
| 10 | BWP 320-c | BWP 320-e | BWP 320-g | BWP 320-j |
| 11 | BWP 320-d | BWP 320-f |  | BWP 320-k |

300-d

| Field Value 305-e | Carrier 310-a | Carrier 310-b |
|---|---|---|
| 000 | TDRA 325-a | TDRA 325-h |
| 001 | TDRA 325-b | TDRA 325-i |
| 010 | TDRA 325-c | TDRA 325-j |
| 011 | TDRA 325-d |  |
| 100 | TDRA 325-e | TDRA 325-h |
| 101 | TDRA 325-f | TDRA 325-i |
| 110 | TDRA 325-g | TDRA 325-j |
| 111 | TDRA 325-d |  |

JOINT INDICATION FOR MULTI-CELL SCHEDULING

FIELD OF TECHNOLOGY

The following relates to wireless communications, including joint indication for multi-cell scheduling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support joint indication for multi-cell scheduling. For example, the described techniques provide for a user equipment (UE) to determine which parameters to use in wireless communication for a set of carriers with varying parameter set sizes. In some cases, the UE may decode a bitfield of a control message that indicates a set of bits that is associated with one or more parameters for one or more carriers of the set of carriers and blank entries for one or more other carriers of the set of (e.g., no configured parameter for the decoded bitfield). In some examples, the UE may assume that carriers with blank entries may not be used for wireless communications (e.g., for a given duration of time). In some examples, the UE may configure a default parameter for each carrier that may be used when a given carrier does not have parameter for the indicated bitfield value. In some examples, the UE may reuse parameters for a given carrier for other bitfield values in a given order (e.g., recursively, cyclically, etc.). In some examples, the UE may reuse parameters of a first bitfield value for a given carrier for other bitfield values that share a same bit value.

In some cases, the network entity may indicate for the UE to perform a bandwidth part (BWP) switching for the multiple carriers, in which the active BWP for each carrier may be switched to a second BWP. In examples where the second BWP supports a different number of parameters, the UE may determine the adjusted bitfield size based on the techniques described herein.

A method for wireless communications is described. The method may include receiving a message indicating one or more sets of parameters for a set of carriers supported by the UE, the one or more sets of parameters indicating communication parameters for communications via the set of carriers, monitoring for a field of a control message based on the message, where a field size of the field is based on the one or more sets of parameters, and where a respective value for the field indicates a respective set of parameters of the one or more sets of parameters for one or more carriers of the set of carriers, and communicating one or more messages via at least one carrier of the set of carriers using the respective set of parameters for the at least one carrier.

An apparatus for wireless communications is described. The apparatus may include a processor, memory coupled with the processor, and instructions stored in the memory. The instructions may be executable by the processor to cause the apparatus to receive a message indicating one or more sets of parameters for a set of carriers supported by the UE, the one or more sets of parameters indicating communication parameters for communications via the set of carriers, monitor for a field of a control message based on the message, where a field size of the field is based on the one or more sets of parameters, and where a respective value for the field indicates a respective set of parameters of the one or more sets of parameters for one or more carriers of the set of carriers, and communicate one or more messages via at least one carrier of the set of carriers using the respective set of parameters for the at least one carrier.

Another apparatus for wireless communications is described. The apparatus may include means for receiving a message indicating one or more sets of parameters for a set of carriers supported by the UE, the one or more sets of parameters indicating communication parameters for communications via the set of carriers, means for monitoring for a field of a control message based on the message, where a field size of the field is based on the one or more sets of parameters, and where a respective value for the field indicates a respective set of parameters of the one or more sets of parameters for one or more carriers of the set of carriers, and means for communicating one or more messages via at least one carrier of the set of carriers using the respective set of parameters for the at least one carrier.

A non-transitory computer-readable medium storing code for wireless communications is described. The code may include instructions executable by a processor to receive a message indicating one or more sets of parameters for a set of carriers supported by the UE, the one or more sets of parameters indicating communication parameters for communications via the set of carriers, monitor for a field of a control message based on the message, where a field size of the field is based on the one or more sets of parameters, and where a respective value for the field indicates a respective set of parameters of the one or more sets of parameters for one or more carriers of the set of carriers, and communicate one or more messages via at least one carrier of the set of carriers using the respective set of parameters for the at least one carrier.

In some examples of the method, apparatuses, and non-transitory computer-readable medium described herein, monitoring for the field of the control message may include operations, features, means, or instructions for decoding one or more bits of the field of the control message based on the field size, where the field size may be based on a number of parameters associated with a set of parameters of the one or more sets of parameters.

Some examples of the method, apparatuses, and non-transitory computer-readable medium described herein may further include operations, features, means, or instructions for determining the field size based on a carrier of the set of carriers, the carrier associated with the set of parameters, where the number of parameters may be greater than respective numbers of parameters for each remaining carrier of the set of carriers.

Some examples of the method, apparatuses, and non-transitory computer-readable medium described herein may further include operations, features, means, or instructions for determining the field size based on a carrier of the set of carriers, the carrier associated with the set of parameters, where the number of parameters may be less than respective numbers of parameters for each remaining carrier of the set of carriers.

In some examples of the method, apparatuses, and non-transitory computer-readable medium described herein, each value of the field for a first subset of carriers of the set of carriers indicates at least one respective parameter for each of the first subset of carriers, the first subset of carriers including the one or more carriers and each value of the field for a second subset of carriers may be associated with a blank value for each of the second subset of the set of carriers, the second subset of carriers excluding the first subset of carriers.

Some examples of the method, apparatuses, and non-transitory computer-readable medium described herein may further include operations, features, means, or instructions for refraining from using a carrier from the second subset of carriers for communicating the one or more messages based on the value of the field for the carrier corresponding to the blank value.

Some examples of the method, apparatuses, and non-transitory computer-readable medium described herein may further include operations, features, means, or instructions for communicating using a respective default parameter for each carrier of the second subset of carriers based on the value of the field for each carrier of the second subset of carriers corresponding to the blank value.

In some examples of the method, apparatuses, and non-transitory computer-readable medium described herein, each respective default parameter corresponds to a zero codepoint field parameter of the respective carrier.

Some examples of the method, apparatuses, and non-transitory computer-readable medium described herein may further include operations, features, means, or instructions for filling blank values for the second subset of carriers for a given value of the field by reusing parameters for the second subset of carriers associated with other values of the field.

In some examples of the method, apparatuses, and non-transitory computer-readable medium described herein, filling blank values for a given carrier of the second subset of carriers may include operations, features, means, or instructions for recursively filling the blank values of the given carrier by reusing parameters for the given carrier associated with other values of the field.

In some examples of the method, apparatuses, and non-transitory computer-readable medium described herein, filling blank values for a given carrier of the second subset of carriers may include operations, features, means, or instructions for filling a first blank value associated with a first value of the field for the given carrier with a parameter associated with a second value of the field for the given carrier based on the first value of the field sharing one or more common bits with the second value of the field.

Some examples of the method, apparatuses, and non-transitory computer-readable medium described herein may further include operations, features, means, or instructions for monitoring for a subset of values of the field from a set of available values of the field, where each of the subset of values includes a respective parameter for each carrier of the set of carriers and communicating the one or more messages based on the field of the control message being a value from the subset of values.

Some examples of the method, apparatuses, and non-transitory computer-readable medium described herein may further include operations, features, means, or instructions for receiving a radio resource control message indicating a number of bits associated with the field for decoding, where the field size may be based on the number of bits.

Some examples of the method, apparatuses, and non-transitory computer-readable medium described herein may further include operations, features, means, or instructions for receiving a second control message indicating a change from the one or more sets of parameters to a second one or more sets of parameters available for the set of carriers for the UE.

In some examples of the method, apparatuses, and non-transitory computer-readable medium described herein, a number of bits associated with the field for the second one or more sets of parameters may be less than a number of bits associated with the field for the one or more sets of parameters.

Some examples of the method, apparatuses, and non-transitory computer-readable medium described herein may further include operations, features, means, or instructions for zeroing values of the field that may be associated with the one or more sets of parameters and disassociated with the second one or more sets of parameters.

In some examples of the method, apparatuses, and non-transitory computer-readable medium described herein, a number of bits associated with the field for the second one or more sets of parameters may be greater than a number of bits associated with the field for the one or more sets of parameters.

Some examples of the method, apparatuses, and non-transitory computer-readable medium described herein may further include operations, features, means, or instructions for interpreting entries of the field for the second one or more sets of parameters using a number of least significant bits associated with the one or more sets of parameters.

In some examples of the method, apparatuses, and non-transitory computer-readable medium described herein, each parameter of one or more sets of parameters includes a BWP or a time domain resource assignment (TDRA).

A method for wireless communications is described. The method may include transmitting a message indicating one or more sets of parameters for a set of carriers supported by a UE, the one or more sets of parameters indicating communication parameters for communications via the set of carriers, transmitting a control message via a carrier of the set of carriers based on the message, where a field size associated with a field of the control message is based on the one or more sets of parameters, where a respective value of the field indicates a respective set of parameters of the one or more sets of parameters for one or more carriers of the set of carriers, and communicating one or more messages via at least one carrier of the set of carriers using the respective set of parameters for the at least one carrier.

An apparatus for wireless communications is described. The apparatus may include a processor, memory coupled with the processor, and instructions stored in the memory. The instructions may be executable by the processor to cause the apparatus to transmit a message indicating one or more sets of parameters for a set of carriers supported by a UE, the one or more sets of parameters indicating communication parameters for communications via the set of carriers, transmit a control message via a carrier of the set of carriers based on the message, where a field size associated with a field of the control message is based on the one or more sets of parameters, where a respective value of the field indicates a respective set of parameters of the one or more sets of parameters for one or more carriers of the set of carriers, and communicate one or more messages via at least one carrier of the set of carriers using the respective set of parameters for the at least one carrier.

Another apparatus for wireless communications is described. The apparatus may include means for transmitting a message indicating one or more sets of parameters for a set of carriers supported by a UE, the one or more sets of parameters indicating communication parameters for communications via the set of carriers, means for transmitting a control message via a carrier of the set of carriers based on the message, where a field size associated with a field of the control message is based on the one or more sets of parameters, where a respective value of the field indicates a respective set of parameters of the one or more sets of parameters for one or more carriers of the set of carriers, and means for communicating one or more messages via at least one carrier of the set of carriers using the respective set of parameters for the at least one carrier.

A non-transitory computer-readable medium storing code for wireless communications is described. The code may include instructions executable by a processor to transmit a message indicating one or more sets of parameters for a set of carriers supported by a UE, the one or more sets of parameters indicating communication parameters for communications via the set of carriers, transmit a control message via a carrier of the set of carriers based on the message, where a field size associated with a field of the control message is based on the one or more sets of parameters, where a respective value of the field indicates a respective set of parameters of the one or more sets of parameters for one or more carriers of the set of carriers, and communicate one or more messages via at least one carrier of the set of carriers using the respective set of parameters for the at least one carrier.

Some examples of the method, apparatuses, and non-transitory computer-readable medium described herein may further include operations, features, means, or instructions for transmitting a radio resource control message indicating a number of bits associated with the field, where the field size may be based on the number of bits.

Some examples of the method, apparatuses, and non-transitory computer-readable medium described herein may further include operations, features, means, or instructions for transmitting a second control message indicating a change from the one or more sets of parameters available for the set of carriers for the UE to a second one or more sets of parameters available for the set of carriers for the UE.

In some examples of the method, apparatuses, and non-transitory computer-readable medium described herein, a number of bits associated with the field for the second one or more sets of parameters may be less than a number of bits associated with the field for the one or more sets of parameters.

In some examples of the method, apparatuses, and non-transitory computer-readable medium described herein, a number of bits associated with the field for the second one or more sets of parameters may be greater than a number of bits associated with the field for the one or more sets of parameters.

In some examples of the method, apparatuses, and non-transitory computer-readable medium described herein, each parameter of one or more sets of parameters includes a BWP or a TDRA.

BRIEF DESCRIPTION OF THE DRAWINGS

FIGS. 3A-3C illustrate examples of a parameter configurations that support joint indication for multi-cell scheduling in accordance with one or more aspects of the present disclosure.

DETAILED DESCRIPTION

Figure 1:
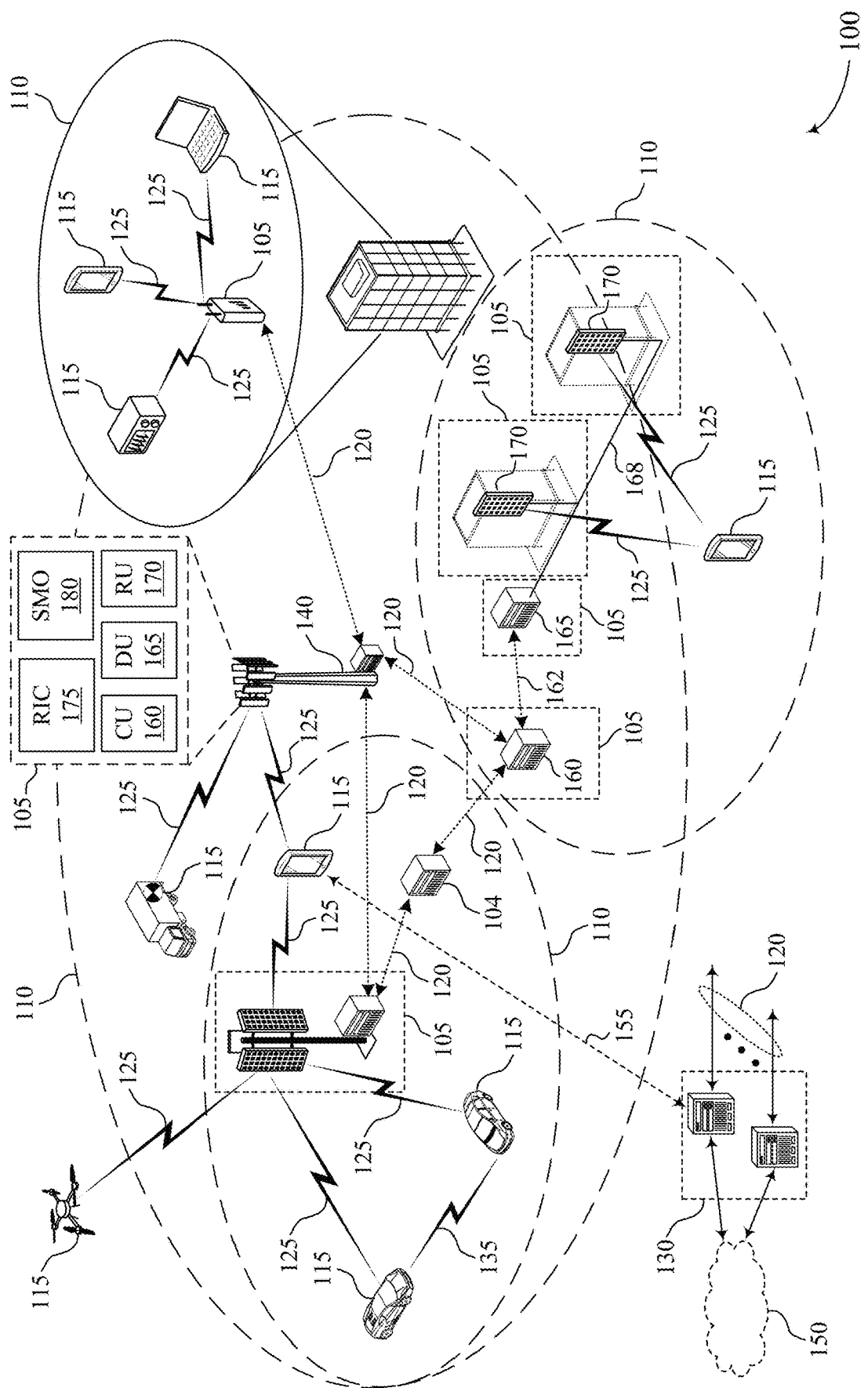
FIG. 1 illustrates an example of a wireless communications system that supports joint indication for multi-cell scheduling in accordance with one or more aspects of the present disclosure.

In some examples or wireless communications a user equipment (UE) and a network entity may communicate via multiple carriers that span respective sets of frequency resources. As such, the network entity may transmit an indication of a set of parameters for each of the multiple carriers to use for wireless communications. Based on configuring the UE with respective sets of parameters for each carrier, the network entity may transmit an indication of which parameters for each carrier UE may use for a given communication. For example, the network entity may transmit a control message with a joint-carrier indication, in which a single bitfield within the control message may indicate respective parameters for all of the carriers (e.g., using a lookup table, the UE interprets the same bitfield differently for each carrier to obtain the communication parameters for each carrier).

However, in scenarios where carriers are configured with different numbers of parameters (or different numbers of parameter sets), the UE may experience an increase in complexity for determining the appropriate parameter to use for each carrier. For example, a first carrier may support four different parameters (e.g., indicated by bitfields: 00, 01, 10, 11) while a second carrier may support two different parameters (e.g., indicated by bitfields: 0, 1). When a joint indication is used by the network, a two-bit bitfield may be used for the first carrier, while a one-bit bitfield may be used for the second carrier. As such, the UE may be unable to interpret the bitfield or determine the size of the bitfield for all the carriers that the UE supports (e.g., the UE may be unable to determine the appropriate parameter set for the second carrier when a two-bit bitfield is used because the UE is expecting a one-bit bitfield).

The UE may determine which parameters to use for a set of carriers with varying parameter set sizes according to the techniques described herein. For example, the UE may determine the bitfield size based on either a maximum or minimum number of parameters supported by a given carrier. Based on determining the size of the bitfield, the UE may decode the bitfield. In some cases, the decoded bitfield may indicate a set of bits that is associated with a blank entry for one or more carriers (e.g., no configured parameter for the decoded bitfield). In some examples, the UE may assume that carriers with blank entries may not be used. In some examples, the UE may configure a default parameter for each carrier that may be used when a given carrier does not have parameter for the indicated bitfield value. In some examples, the UE may reuse parameters for a given carrier for other bitfield values in a given order (e.g., recursively, cyclically, etc.). In some examples, the UE may reuse parameters of a first bitfield value for a given carrier for other bitfield values that share a same bit value.

In some cases, the network entity may indicate for the UE to perform a bandwidth part (BWP) switching for the multiple carriers, in which the active BWP for each carrier may be switched to a second BWP. In examples where the second BWP supports a different number of parameters, the UE may determine the adjusted bitfield size based on the techniques described herein.

Aspects of the disclosure are initially described in the context of wireless communications systems. Aspects of the disclosure are further illustrated by and described with reference parameter configurations, BWP configuration timing diagrams, and process flows. Aspects of the disclosure are further illustrated by and described with reference to apparatus diagrams, system diagrams, and flowcharts that relate to joint indication for multi-cell scheduling.

FIG. 1 illustrates an example of a wireless communications system 100 that supports joint indication for multi-cell scheduling in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support joint indication for multi-cell scheduling as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples or wireless communications system 100, a UE 115 and a network entity 105 may communicate via multiple carriers that span respective sets of frequency ranges. As such, the network entity 105 may transmit an indication of a set of parameters for each of the multiple carriers to use for wireless communications. Based on configuring the UE 115 with respective sets of parameters for each carrier, the network entity 105 may transmit an indication of which parameters for each carrier UE 115 may use for a given communication. For example, the network entity 105 may transmit a control message with a joint-carrier indication, in which a single bitfield within the control message may indicate respective parameters for all of the carriers. However, cases where carriers are configured with different numbers of parameters, the UE 115 may experience an increase in complexity for determining the appropriate parameter to use for each carrier.

As such, UE 115 may determine which parameters to use for a set of carriers with varying parameter set sizes according to the techniques described herein. For example, the UE 115 may determine the bitfield size based on either a maximum or minimum number of parameters supported by a given carrier. Based on determining the size of the bitfield, the UE 115 may decode the bitfield. In some cases, the decoded bitfield may indicate a set of bits that is associated with a blank entry for one or more carriers (e.g., no configured parameter for the decoded bitfield). In some examples, the UE 115 may assume that carriers with blank entries may not be used. In some examples, the UE 115 may configure a default parameter for each carrier that may be used when a given carrier does not have parameter for the indicated bitfield value. In some examples, the UE 115 may recursively reuse parameters for a given carrier for other bitfield values in a given order. In some examples, the UE 115 may reuse parameters of a first bitfield value for a given carrier for other bitfield values that share a same bit value. In some cases, the network entity 105 may indicate for the UE 115 to perform BWP-switching for the multiple carriers, in which the active BWP for each carrier may be switched to a second BWP. In examples where the second BWP supports a different number of parameters, the UE 115 may determine the adjusted bitfield size based on the techniques described herein.

Figure 2:
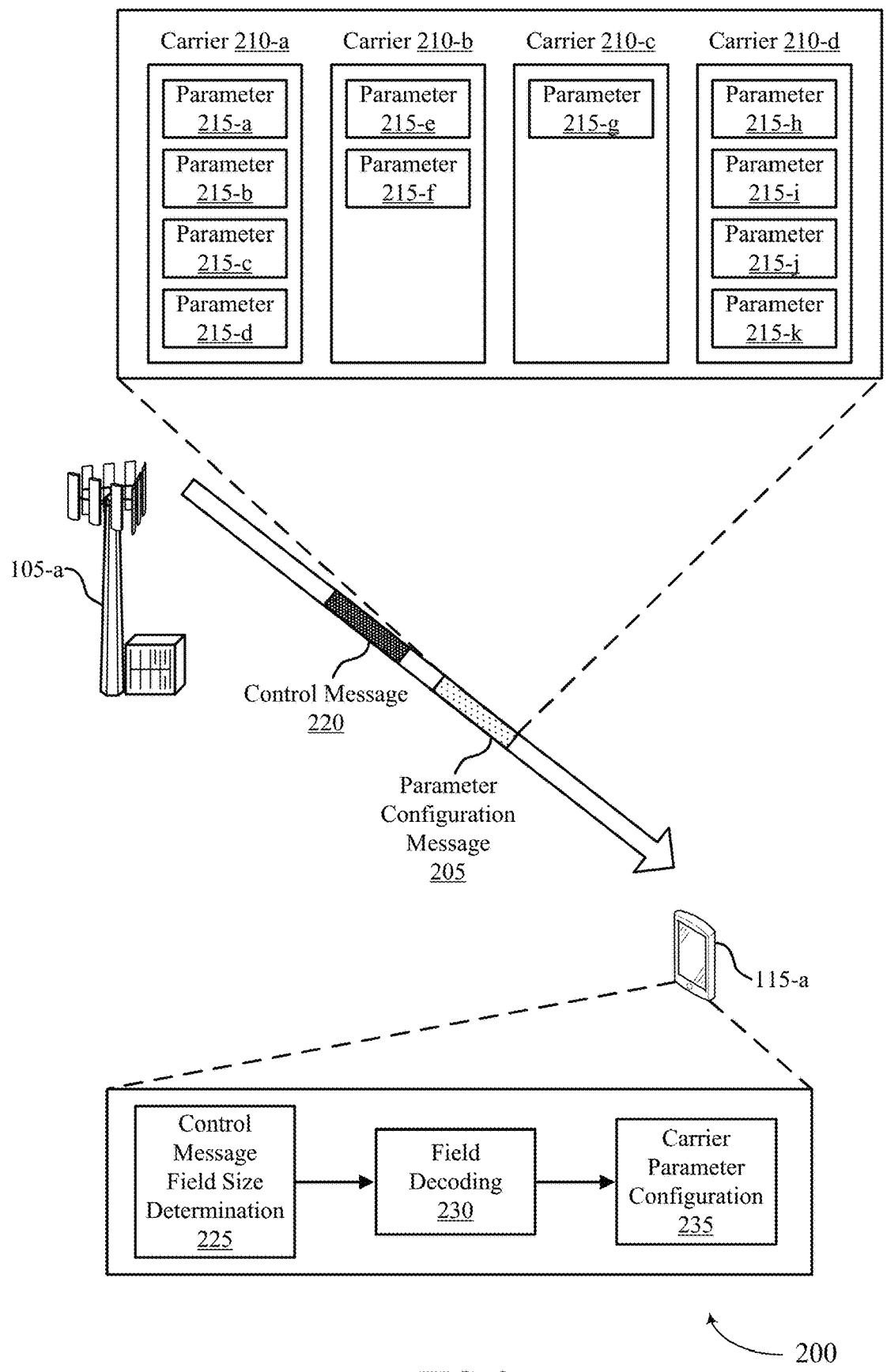
FIG. 2 illustrates an example of a wireless communications system that supports joint indication for multi-cell scheduling in accordance with one or more aspects of the present disclosure.

FIG. 2 illustrates an example of a wireless communications system 200 that supports joint indication for multi-cell scheduling in accordance with one or more aspects of the present disclosure. In some examples, wireless communications system 200 may implement one or more aspects of wireless communications system 100. For instance, UE 115-a and network entity 105-a may be respective examples of a UE 115-a 115 and a network entity 105-a as described with reference to FIG. 1.

In some examples, the UE 115-a and the network entity 105-a may communicate via multiple carriers 210 that span respective sets of frequency resources. As such, the network entity 105-a may transmit a parameter configuration message 205 to the UE 115-a that may indicate a set of parameters 215 for each of the multiple carriers 210 to use for wireless communications. When communicating via a given carrier 210, the UE 115-a may use the parameters 215 for uplink communications, downlink communications, or both. For instance, the parameters 215 of the parameter configuration message 205 may include a BWP indicator, a frequency domain resource assignment (FDRA), a time domain resource assignment (TDRA), a modulation and coding scheme (MCS), redundancy versions, a hybrid automatic repeat request (HARQ) process number, a rate matching number, or any combination thereof.

Based on configuring the UE 115-a with respective sets of parameters 215 for each carrier 210, the network entity 105-a may transmit a control message 220 (e.g., a downlink control information (DCI) message) that may indicate which of the parameters 215 for each carrier 210 the UE 115-a may use for a given communication. In some examples, the network entity 105-a may transmit a control message 220 with a per carrier 210 indication, in which multiple fields of the control message 220 or multiple control messages 220 are used to respectively indicate parameters 215 for each carrier 210 of the multiple carriers 210. In some examples, the network entity 105-a may transmit a control message 220 with a joint-carrier 210 indication, in which a single bitfield within a control message 220 may indicate respective parameters 215 for all of the carriers 210 (e.g., using a lookup table, the UE 115-a interprets the same bitfield differently for each carrier 210 to obtain the communication parameters 215 for each carrier 210).

In some examples, the per carrier 210 indication may increase flexibility in parameter 215 configuration, but may also increase overhead of the wireless communications system 200. As such, the network entity 105-a may reduce overhead of the network by operating in accordance with the joint-carrier 210 indication techniques. However, cases where carriers 210 are configured with different numbers of parameters 215 (e.g., different number of entries of a parameter 215, a list, or an information element (IE)), the UE 115-a may experience an increase in complexity for determining the appropriate parameter 215 to use for each carrier 210. For instance as illustrated in FIG. 2, carrier 210-a may be configured with four parameters 215 (e.g., parameters 215-a, 215-b, 215-c, and 215-d), carrier 210-b may be configured with two parameters 215 (e.g., parameters 215-e and 215-f), carrier 210-c may be configured with one parameter 215 (e.g., parameters 215-g), and carrier 210-a may be configured with four parameters 215 (e.g., parameters 215-h, 215-i, 215-j, and 215-k). As such, carrier 210-a may support four different parameters 215 that may be indicated by bitfields 00, 01, 10, and 11 while carrier 210-b may support two different parameters 215 indicated by bitfields 0 and 1. Based on the parameters 215 of different carriers 210 being associated with different bitfield sizes (e.g., a 2-bit bitfield or a 1-bit bitfield as illustrated in FIG. 2), the UE 115-a may be unable to interpret a single bitfield to determine a parameter 215 for each carrier 210.

The UE 115-a may determine which parameters 215 to use for the given carriers 210 with varying parameter 215 set sizes according to the techniques described herein. For example, the UE 115-a may perform a control message field size determination 225 based on the number of parameters 215 configured for each carrier 210. In some examples, the UE 115-a may determine the field size within the control message 220 based on a maximum number of parameters 215 supported by a given carrier 210 (e.g., $N_{max}$). For instance, the UE 115-a may determine the field size (F) in accordance with Equation 1:

$$F=\log_2(N_{max}) \quad (1)$$

In some examples, the field size is rounded up to the nearest integer. For instance, if the greatest number of parameters 215 configured to a carrier 210 of the set of carriers 210 was seven parameters 215, the associated field size would be three bits. In some examples, the UE 115-a may determine the field size within the control message 220 based on a minimum number of parameters 215 supported by a given carrier 210 (e.g., $N_{min}$). For instance, the UE 115-a may determine the field size (F) in accordance with Equation 2:

$$F=\log_2(N_{min}) \quad (2)$$

In some cases, the field size is rounded up to the nearest integer. For instance, if the lowest number of parameters 215 configured to a carrier 210 of the set of carriers 210 was one parameter 215, the associated field size would be one bit.

Based on executing the control message field size determination 225, the UE 115-a may conduct a field decoding 230 procedure to decode the field of the control message 220. In some cases, however, the decoded bitfield may indicate a set of bits that is associated with a blank entry for one or more carriers 210 (e.g., an entry that is blank, null, N/A, no entry, not configured, or no associated value). For example, with reference to FIG. 2, if the bitfield indicated a value of 01, that may indicate for the UE 115-a to use parameter 215-b for carrier 210-a, to use parameter 215-f for carrier 210-b, to use parameter 215-i for carrier 210-d, and no parameter 215 to use for carrier 210-c. In some examples, the UE 115-a 115 may resolve blank entries for a given carrier 210 in accordance with techniques of a carrier parameter configuration 235. In some examples, the UE 115-a may assume that carriers 210 with blank entries may not be used. In some examples, the UE 115-a may configure a default parameter 215 for each carrier 210 that may be configured when a given carrier 210 does not have parameter 215 for the indicated bitfield value. In some examples, the UE 115-a may reuse parameters 215 for a given carrier 210 for other bitfield values in a given order (e.g., recursively, cyclically, etc.). In some examples, the UE 115-a may reuse parameters 215 of a first bitfield value for a given carrier 210 for other bitfield values that share a same bit value (e.g., a same least significant bit (LSB) or a same most significant bit (MSB)). In some examples, the network entity 105-a may configure additional parameters 215 for carriers 210 with a blank entry for a given bitfield value via RRC. Further discussion of carrier parameter configuration 235 techniques are described herein, including with reference to FIGS. 3A through 3B.

In some cases, the network entity 105-a may indicate for the UE 115-a to perform BWP-switching for the multiple carriers 210, in which the active BWP for each carrier 210 may be switched to a second BWP. In examples where the second BWP supports a different number of parameters 215 (i.e., carrier 210-a for the active BWP supports four parameters 215 and carrier 210-a for the second BWP supports two parameters 215), the UE 115-a may determine the adjusted field size for the control message 220 based on the techniques described herein. Further discussion of BWP-switching for multiple carriers 210 are described herein, including with reference to FIGS. 4 and 5.

FIG. 3A illustrates an example of a parameter configuration 300-a that supports joint indication for multi-cell scheduling in accordance with one or more aspects of the present disclosure. In some examples, the parameter configuration 300-a may implement one or more aspects of wireless communications system 100, wireless communications system 200, or a combination thereof. For instance, carrier 310-a, carrier 310-b, carrier 310-c, and carrier 310-d may be examples of carriers 210 with reference to FIG. 2. Additionally, or alternatively, parameters 315-a through 315-k may be examples of parameters 215 with reference to FIG. 2.

As illustrated in FIG. 3A, a UE 115 may be configured with a set of parameters 315 for each carrier 310. For instance, carrier 310-a may be configured with four parameters 315 (e.g., parameters 315-a, 315-b, 315-c, and 315-d), carrier 310-b may be configured with two parameters 315 (e.g., parameters 315-e and 315-f), carrier 310-c may be configured with one parameter 315 (e.g., parameter 315-g), and carrier 310-a may be configured with four parameters 315 (e.g., parameters 315-h, 315-i, 315-j, and 315-k). In the example of FIG. 3A, the UE 115 may determine the bitfield size in accordance with Equation 1 as described with reference to FIG. 2 (e.g., the field size is based on the maximum number of parameters 315 configured for a given carrier 310). In some other implementations, the UE 115 may determine the bitfield size in accordance with Equation 2 as described with reference to FIG. 2 (e.g., the field size is based on the minimum number of parameters 315 configured for a given carrier 310). In some other implementations, the UE 115 may determine the bitfield size based on receiving from a network entity 105 an RRC message configuring the bitfield size.

Based on the UE 115 determining a bitfield size of two, one or more carriers 310 may have blank entries for one or more field values 305-a of the bitfield. For example, the carrier 310-b may have blank entries for values 10 and 11 of the field value 305-a and carrier 310-c may have blank entries for values 01, 10, and 11 of the field value 305-a. In some examples, the blank entries may be examples of a blank parameter 315, a null parameter 315, N/A, no entry, a non-configured parameter 315, or no associated value.

As such, the UE 115 may handle blank entries for carriers 310 according to the techniques described herein. In some examples, the if the UE 115 receives a DCI message with a field value 305-a that indicates a blank entry for a carrier 310 (or a cell), the UE 115 may determine that the DCI message may not schedule data on the carrier 310 (or cell). For example, if the UE 115 receives a value of 10 for field value 305-a, the UE 115 may determine that the DCI message may not schedule data for carrier 310-b or carrier 310-c.

Additionally, or alternatively, if the UE 115 receives a DCI message with a field value 305-a that indicates a blank entry for a carrier 310 (or a cell), the UE 115 may determine that the DCI message schedules data via a default configuration (e.g., a default parameter 315) for the carrier 310. For example, if the UE 115 receives a value of 10 for field value 305-a, the UE 115 may use a default parameter 315 for carrier 310-b and a default parameter 315 for 310-c. In some examples, the default parameter 315 for a given carrier may be the parameter 315 associated with a bitfield or codepoint of all zeros (e.g., value 00 for field value 305-a). For example, with reference to FIG. 3A, the default parameter 315 for carrier 310-b may be parameter 315-e and the default parameter 315 for carrier 310-c may be parameter 315-g. In some other examples, the default parameter 315 for a given carrier 310 may be a parameter 315 currently configured for the given carrier 310. For example, carrier 310-b may be currently configured with parameter 315-f. As such, if the UE 115 receives a value of 10 for field value 305-a, the UE 115 may determine to continue using parameter 315-f for carrier 310-b.

Additionally, or alternatively, the UE 115 may not expect to receive a DCI field with a field value 305-a that has a blank entry for at least one of the configured carriers 310. For example, with reference to FIG. 3A, the UE 115 may refrain from monitoring for values of 01, 10, and 11 for field value 305-a based on either carrier 310-b, carrier 310-c, or both having blank entries for those field values 305-a. Additionally or alternatively, the network entity 105 may refrain from transmitting a DCI with values of 01, 10, and 11 for field value 305-a based on either carrier 310-b, carrier 310-c, or both having blank entries for those field values 305-a.

FIG. 3B illustrates an example of a parameter configuration 300-b and a parameter configuration 300-c that support joint indication for multi-cell scheduling in accordance with one or more aspects of the present disclosure. In some examples, the parameter configuration 300-b and 300-c may implement one or more aspects of wireless communications system 100, wireless communications system 200, parameter configuration 300-a, or a combination thereof. For instance, carrier 310-a, carrier 310-b, carrier 310-c, and carrier 310-d may be examples of carriers 210 with reference to FIG. 2. Additionally, or alternatively, BWP 320-a through BWP 320-k and TDRA 325-a through TDRA 325-j may be examples of parameters 215 with reference to FIG. 2 or parameters 315 with reference to FIG. 3A.

With reference to parameter configuration 300-b, each field value 305-b may indicate a BWP 320 configuration from one or more BWP 320 configurations for each carrier 310. With reference to parameter configuration 300-c, each field value 305-c may indicate a TDRA 325 configuration from one or more TDRA 325 configurations for each carrier 310. In some examples, a TDRA 325 may be an example of a start and length indicator value (SLIV) or a slot-offset value (e.g., a k0 or k2 time domain allocation). As discussed with reference to FIG. 3A, the UE 115 may also determine the bitfield size in accordance with Equation 1 for parameter configuration 300-b and parameter configuration 300-c. In some other implementations, the UE 115 may determine the bitfield size in accordance with Equation 2. In some other implementations, the UE 115 may determine the bitfield size based on receiving from the network entity 105 an RRC message configuring the bitfield size.

As illustrated in FIG. 3B, a UE 115 may be configured with a set of BWPs 320 for each carrier 310. For instance, carrier 310-*a* may be configured with four BWPs 320 (e.g., BWP 320-*a*, 320-*b*, 320-*c*, and 320-*d*), carrier 310-*b* may be configured with two BWPs 320 (e.g., BWP 320-*e* and 320-*f*), carrier 310-*c* may be configured with one BWP 320 (e.g., BWP 320-*g*), and carrier 310-*a* may be configured with four BWPs 320 (e.g., BWP 320-*h*, 320-*i*, 320-*j*, and 320-*k*). Additionally, or alternatively, the UE 115 may be configured with a set of TDRAs 325 for the carriers 310. For instance, carrier 310-*a* may be configured with seven TDRAs 325 (e.g., TDRA 325-*a*, 325-*b*, 325-*c*, 325-*d*, 325-*e*, 325-*f*, and 325-*g*) and carrier 310-*b* may be configured with three TDRAs 325 (e.g., TDRA 325-*h*, 325-*i*, and 325-*j*).

In some examples, the parameter configuration 300-*b* and parameter configuration 300-*c* may be related. For example, the respective sets of TDRAs 325 for carrier 310-*a* and carrier 310-*b* may be configured for a given BWP 320 for carrier 310-*a* and carrier 310-*b*. For instance, TDRA 325-*a* through 325-*g* may be associated with BWP 320-*a* for carrier 310-*a*, and TDRA 325-*h* through 325-*j* may be associated with BWP 320-*e* for carrier 310-*b*.

In some examples, the carriers 310 may be configured with various numbers of BWPs 320 and TDRAs 325, and as such, one or more of the field values 305-*b* and 305-*c* may have blank entries for one or more of the carriers 310. In some examples, the UE 115 may determine to fill blank entries with values of existing entries recursively or cyclically. For example, the UE 115 may fill value 10 for field value 305-*b* with BWP 320-*e* and 11 with BWP 320-*f*. In examples where there are more field values 305-*b* to fill for carrier 310-*a*, the UE 115 would recursively fill BWP 320-*e* and BWP 320-*f* until each field value 305-*b* for carrier 310-*b* was filled. Similarly, for carrier 310-*c* the UE 115 may recursively fill values 01, 10, and 11 for field value 305-*b* with BWP 320-*g*. In some examples, the UE 115 may use the same techniques of filling parameter configuration 300-*b* to fill parameter configuration 300-*c*. For example, with reference to carrier 310-*b*, the UE 115 may recursively fill field values 305-*c* with TDRA 325-*h*, TDRA 325-*i*, and TDRA 325-*j* until each value of the field value 305-*c* is filled.

FIG. 3C illustrates an example of a parameter configuration 300-*d* and a parameter configuration 300-*e* that support joint indication for multi-cell scheduling in accordance with one or more aspects of the present disclosure. In some examples, the parameter configuration 300-*d* and parameter configuration 300-*e* may be respective examples of parameter configuration 300-*b* and parameter configuration 300-*c* with reference to FIG. 3B. As such, FIG. 3C may illustrate an additional or alternative filling technique to the filling techniques described with reference to FIG. 3B.

As illustrated with reference to FIG. 3C, the UE 115 may determine to fill blank entries with values of existing entries that share a similar bit value. For example, the UE 115 may fill field values 305-*d* and 305-*e* with existing entries that share a same LSB value. For instance with reference to carrier 310-*b*, the UE 115 may fill value 10 of field value 305-*d* with BWP 320-*e* based on value 10 sharing an LSB with value 00 and may fill value 11 of field value 305-*d* with BWP 320-*f* based on value 11 sharing an LSB with value 01. In examples, where an existing entry is a blank entry, the UE 115 may refrain from filling an entry sharing an LSB value. For instance with reference to carrier 310-*c*, the UE 115 may refrain from filling value 11 of field value 305-*d* based on value 01 being a blank entry for carrier 310-*c*. As illustrated in FIG. 3C, the UE 115 may fill parameter configuration 300-*e* using the same techniques to fill parameter configuration 300-*d*. While FIG. 3C illustrates LSB based filling techniques, in some other implementations, the UE 115 may employ MSB based filling techniques in which the UE 115 fills empty entries using existing entries that share a same MSB.

Figure 4:
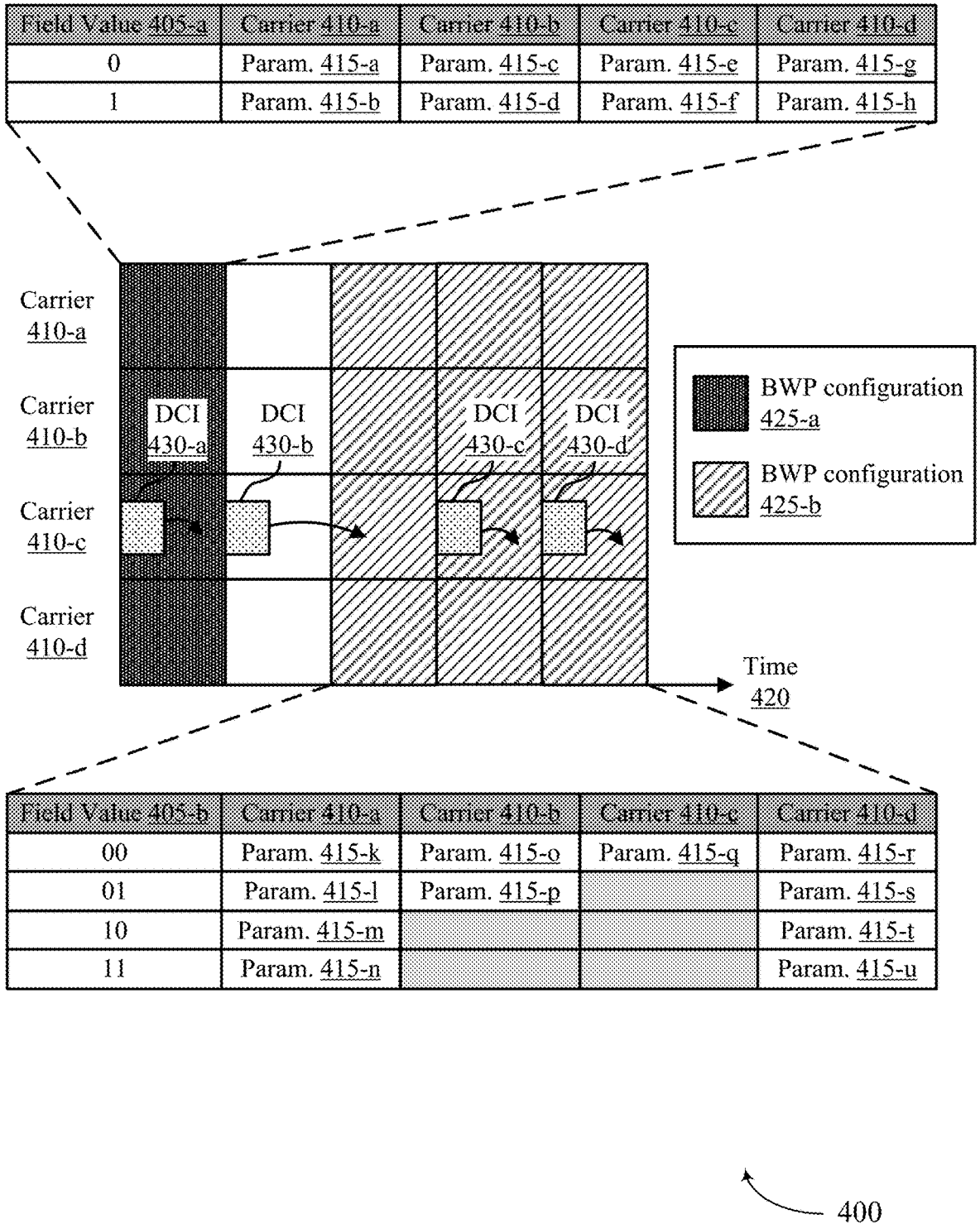
FIG. 4 illustrates an example of a bandwidth part (BWP) configuration timing diagram that supports joint indication for multi-cell scheduling in accordance with one or more aspects of the present disclosure.

FIG. 4 illustrates an example of a BWP configuration timing diagram 400 that supports joint indication for multi-cell scheduling in accordance with one or more aspects of the present disclosure. In some examples, the BWP configuration timing diagram 400 may implement one or more aspects of wireless communications system 100, wireless communications system 200, parameter configurations 300-*a* through 300-*e*, or a combination thereof. For instance, carrier 410-*a*, carrier 410-*b*, carrier 410-*c*, and carrier 410-*d* may be examples of carriers 210 with reference to FIG. 2 or carriers 310 with reference to FIGS. 3A through 3C. Additionally, or alternatively, parameters 415 may be examples of parameters 215 with reference to FIG. 2 or parameters 315 with reference to FIG. 3.

As illustrated in FIG. 4, a UE 115 may be configured with a set of carriers 410 to use for uplink and downlink communications with a network. In some examples, the network entity 105 may configure the UE 115 with a first BWP (e.g., a BWP configuration 425-*a*) where the UE 115 uses a first respective BWP for each carrier 410. In some examples, the network entity 105 may configure the UE 115 to use the first respective BWPs for a duration of time 420 (e.g., a number of timing resources or a number of timing slots). For example, with reference to FIG. 4, the network entity 105 may configure the use of the first respective BWPs for a first slot. In some examples, each carrier 410 using the first respective BWP may also be associated with one or more parameters 415 associated with the first respective BWP. For example, while configured with BWP configuration 425-*a*, carrier 410-*a* may be configured with parameters 415-*a* and 415-*b*, carrier 410-*b* may be configured with parameters 415-*c* and 415-*d*, carrier 410-*c* may be configured with parameters 415-*e* and 415-*f*, and carrier 410-*d* may be configured with parameters 415-*g* and 415-*h*. As such, in accordance with either Equation 1 or Equation 2, the UE 115 may determine bitfield size of two for field value 405-*a*. In some other examples, the UE 115 may determine the bitfield size based on receiving from the network entity 105 an RRC configuration message configuring the bitfield size.

In some cases, the UE 115 may receive a DCI 430-*a* from the network entity 105 which may indicate a field value 405-*a* (e.g., a 0 or 1) for the UE 115 to use in determining which parameters 415 to use. In some cases, however, the UE 115 may receive a DCI-based BWP-Switch in which the size of the bitfield associated with parameters 415 may change. For example, the UE 115 may receive a DCI 430-*b* which may indicate for the UE 115 to switch from the first respective BWP for each carrier 410 (e.g., the BWP configuration 425-*a*) to a second respective BWP for each carrier 410 (e.g., a BWP configuration 425-*b*). As illustrated in FIG. 4, when associated with BWP configuration 425-*b*, each carrier 410 may have a varying number of parameters 415. For example, with reference to BWP configuration 425-*b*, the carrier 410-*a* may be associated with four parameters 415 (e.g., parameter 415-*k*, 415-*l*, 415-*m*, and 415-*n*), the carrier 410-*b* may be associated with two parameters 415 (e.g., parameter 415-*o* and 415-*p*), the carrier 410-*c* may be associated with one parameter 415 (e.g., parameter 415-*q*), and the carrier 410-*d* may be associated with four parameters 415 (e.g., parameter 415-*r*, 415-*s*, 415-*t*, and 415-*u*). As such, the bitfield for field values 405-*b* may have a greater number of bits (e.g., two bits) compared to the bitfield field for field values 405-*a* (e.g., one bit). In examples where the bitfield increases from a first BWP configuration to a second BWP configuration, the UE 115 may interpret the bitfield using a number of LSBs of the DCI format equal to the bitfield used for uplink BWP and downlink BWP prior to interpreting the DCI format information fields. For example, with reference to BWP configuration 425-*b*, the UE 115 may interpret the bitfield size using the two LSBs of the DCI 430-*b* bitfield based on the greatest number of parameters 415 configured for a carrier 410 being four. Based on switching to the BWP configuration 425-*b*, the UE 115 may periodically receive DCIs 430 (e.g., DCI 430-*c* and 430-*d*) that may indicate a field value 405-*b* of the bitfield to use in determining which parameters 415 to use for the respective carriers 410.

In some cases, the UE 115 may fill blank entries of a parameter configuration according to one or more of the techniques described with reference to FIGS. 3A through 3C. In some examples, the if the UE 115 receives a DCI 430 with a field value 405-*b* that indicates a blank entry for a carrier 410 (or a cell), the UE 115 may determine that the DCI 430 may not schedule data on the carrier 410 (or cell). In some examples, if the UE 115 receives a DCI 430 with a field value 405-*b* that indicates a blank entry for a carrier 410 (or a cell), the UE 115 may determine that the DCI 430 schedules data via a default configuration (e.g., a default parameter 415) for the carrier 410, as described with reference to FIG. 3A. Additionally, or alternatively, the UE 115 may refrain from monitoring for a DCI bitfield with a field value 405-*b* that has a blank entry for at least one of the configured carriers 410. In some examples, the UE 115 may fill blank entries recursively, as described with reference to FIG. 3B. In some examples, the UE 115 may fill blank entries based on a first field value 405-*b* sharing a same bit value with a second field value 405-*b* (e.g., LSB based filling or MSB based filling), as described with reference to FIG. 3C.

In some examples, the UE 115 may receive a DCI 430 that indicates for the UE 115 to transition from a BWP configuration 425 configured with more parameters 415 to a BWP configuration 425 configured with less parameters 415. For example, a DCI 430 may indicate for the UE 115 to switch from BWP configuration 425-*b* to BWP configuration 425-*a*. In such examples, the UE 115 may determine the size of the bitfield by prepending zeros to values of the bitfield until the size of the bitfield is the size used for interpreting the BWP configuration 425 with less parameters 415. For example, with reference to FIG. 4, if the UE switched from the BWP configuration 425-*b* to the BWP configuration 425-*a*, the UE 115 would prepend zeros to bitfield until the bitfield is a one-bit bitfield (e.g., the size used to interpret the carriers 410 associated with BWP configuration 425-*a*).

Figure 5:
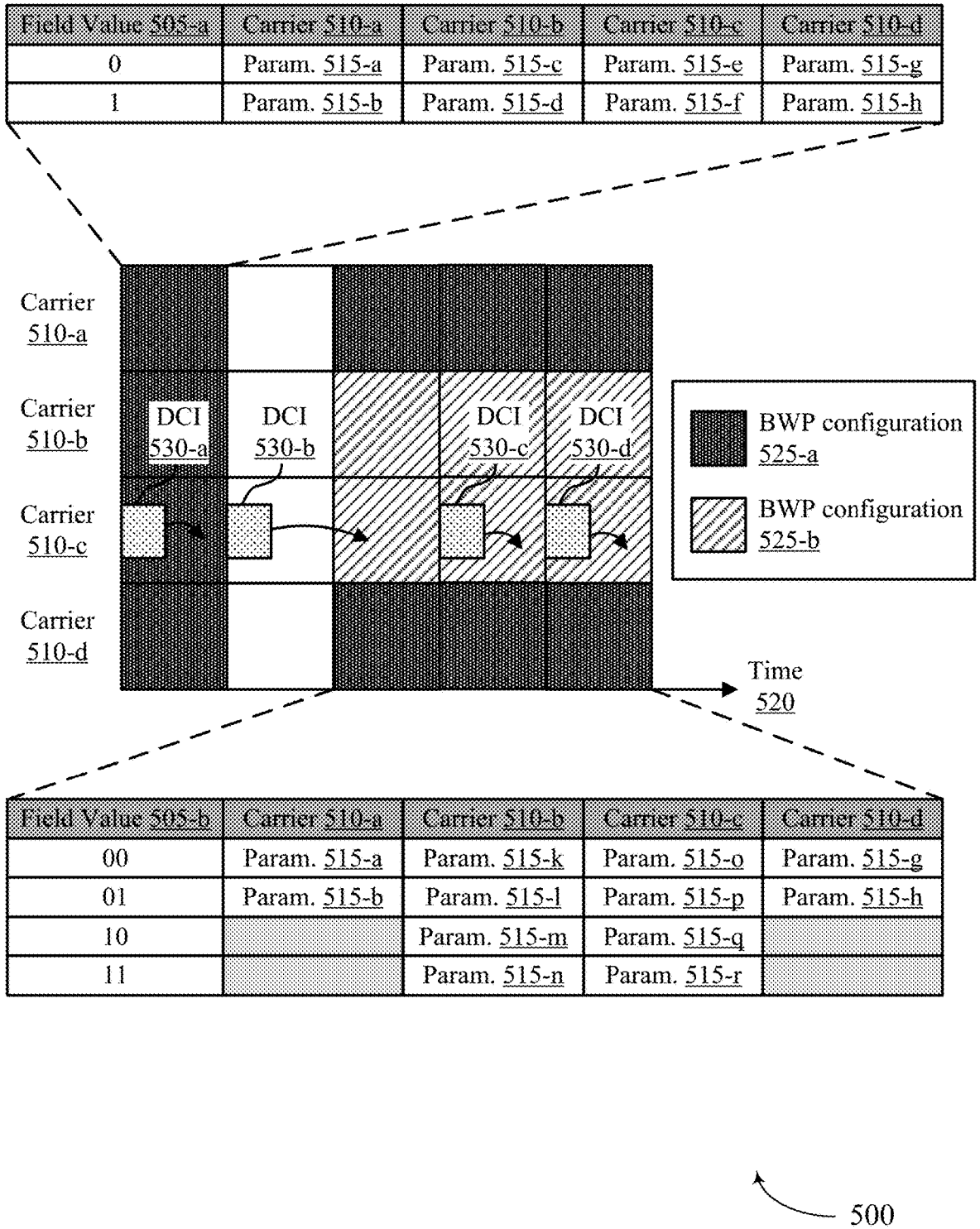
FIG. 5 illustrates an example of a BWP configuration timing diagram that supports joint indication for multi-cell scheduling in accordance with one or more aspects of the present disclosure.

FIG. 5 illustrates an example of a BWP configuration timing diagram 500 that supports joint indication for multi-cell scheduling in accordance with one or more aspects of the present disclosure. In some examples, the BWP configuration timing diagram 500 may implement one or more aspects of wireless communications system 100, wireless communications system 200, parameter configurations 300-*a* through 300-*e*, or a combination thereof. For instance, carrier 510-*a*, carrier 510-*b*, carrier 510-*c*, and carrier 510-*d* may be examples of carriers 210 with reference to FIG. 2, carriers 310 with reference to FIGS. 3A through 3C, or carriers 410 with reference to FIG. 4. Additionally, or alternatively, parameters 515 may be examples of parameters 215 with reference to FIG. 2, parameters 315 with reference to FIG. 3, or parameters 415 with reference to FIG. 4.

As illustrated in FIG. 5, a UE 115 may be configured with a set of carriers 510 to use for uplink or downlink communications with a network. In some examples, the network entity 105 may configure the UE 115 with a first BWP (e.g., a BWP configuration 525-*a*) where the UE 115 uses a first respective BWP for each carrier 510. In some examples, the network entity 105 may configure the UE 115 to use the first respective BWPs for a duration of time 520 (e.g., a number of timing resources or a number of timing slots). For example, with reference to FIG. 5, the network entity 105 may configure the use of the first respective BWPs for a first slot. In some examples, each carrier 510 using the first respective BWP may also be associated with one or more parameters 515 associated with the first respective BWP. For example, while configured with BWP configuration 525-*a*, carrier 510-*a* may be configured with parameters 515-*a* and 515-*b*, carrier 510-*b* may be configured with parameters 515-*c* and 515-*d*, carrier 510-*c* may be configured with parameters 515-*e* and 515-*f*, and carrier 510-*d* may be configured with parameters 515-*g* and 515-*h*. As such, in accordance with either Equation 1 or Equation 2, the UE 115 may determine bitfield size of two for field value 505-*a*. In some other examples, the UE 115 may determine the bitfield size based on receiving from the network entity 105 an RRC configuration message configuring the bitfield size.

In some cases, the UE 115 may receive a DCI 530-*a* from the network entity 105 which may indicate a field value 505-*a* (e.g., a 0 or 1) for the UE 115 to use in determining which parameters 515 to use. In some cases, however, the UE 115 may receive a DCI-based BWP-Switch in which the size of the bitfield associated with parameters 515 may change. For example, the UE 115 may receive a DCI 530-*b* which may indicate for the UE 115 to switch from the first respective BWP for one or more carriers 510 (e.g., the BWP configuration 525-*a*) to a second respective BWP for the one or more carriers 510 (e.g., a BWP configuration 525-*b*). As illustrated in FIG. 5, the DCI 530-*b* may indicate for carriers 510-*b* and 510-*c* to switch to the BWP configuration 525-*b* and for the carriers 510-*a* and 510-*d* to remain in the BWP configuration 525-*a*. Based on carriers 510-*b* and 510-*c* switching to the BWP configuration 525-*b*, each carrier 510 may have a varying number of parameters 515. For example, the carrier 510-*a* may remain associated with the previous two parameters 515 (e.g., parameter 515-*a* and 515-*b*), the carrier 510-*b* may be associated with four parameters 515 (e.g., parameter 515-*k*, 515-*l*, 515-*m*, and 515-*n*), the carrier 510-*c* may be associated with four parameters 515 (e.g., parameter 515-*o*, 515-*p*, 515-*q*, and 515-*r*), and the carrier 510-*d* may remain associated with the previous two parameters 515 (e.g., parameter 515-*g* and 515-*h*). As such, the bitfield for field values 505-*b* may have a greater number of bits (e.g., two bits) compared to the bitfield field for field values 505-*a* (e.g., one bit). In examples where the bitfield increases from a first BWP configuration to a second BWP configuration, the UE 115 may interpret the bitfield using a number of LSBs of the DCI format equal to the bitfield used for uplink BWP and downlink BWP prior to interpreting the DCI format information fields. For example, with reference to DCI 530-*b* switching carriers 510-*b* and 510-*c* to BWP configuration 525-*b*, the UE 115 may interpret the bitfield size using the two LSBs of the DCI 530-*b* bitfield based on the greatest number of parameters 515 configured for a carrier 510 being four. In some cases, the UE 115 may periodically receive DCIs 530 (e.g., DCI 530-*c* and 530-*d*)

that may indicate a field value 505-*b* of the bitfield to use in determining which parameters 515 to use for the respective carriers 510.

In some cases, the UE 115 may fill blank entries of a parameter configuration according to one or more of the techniques described with reference to FIGS. 3A through 3C. In some examples, the if the UE 115 receives a DCI 530 with a field value 505-*b* that indicates a blank entry for a carrier 510 (or a cell), the UE 115 may determine that the DCI 530 may not schedule data on the carrier 510 (or cell). In some examples, if the UE 115 receives a DCI 530 with a field value 505-*b* that indicates a blank entry for a carrier 510 (or a cell), the UE 115 may determine that the DCI 530 schedules data via a default configuration (e.g., a default parameter 515) for the carrier 510, as described with reference to FIG. 3A. Additionally, or alternatively, the UE 115 may refrain from monitoring for a DCI bitfield with a field value 505-*b* that has a blank entry for at least one of the configured carriers 510. In some examples, the UE 115 may fill blank entries recursively, as described with reference to FIG. 3B. In some examples, the UE 115 may fill blank entries based on a first field value 505-*b* sharing a same bit value with a second field value 505-*b* (e.g., LSB based filling or MSB based filling), as described with reference to FIG. 3C.

In some examples, the UE 115 may receive a DCI 530 that indicates for the UE 115 to transition from a BWP configuration 525 configured with more parameters 515 to a BWP configuration 525 configured with less parameters 515. For example, a DCI 530 may indicate for the UE 115 to switch carriers 510-*b* and 510-*c* from BWP configuration 525-*b* back to BWP configuration 525-*a*. In such examples, the UE 115 may determine the size of the bitfield by prepending zeros to values of the bitfield until the size of the bitfield is the size used for interpreting the BWP configuration 525 with less parameters 515. For example, with reference to FIG. 5, if each carrier 510 is switched back to the BWP configuration 525-*a*, the UE 115 would prepend zeros to bitfield until the bitfield is a one-bit bitfield (e.g., the size used to interpret the carriers associated with BWP configuration 525-*a*).

Figure 6:
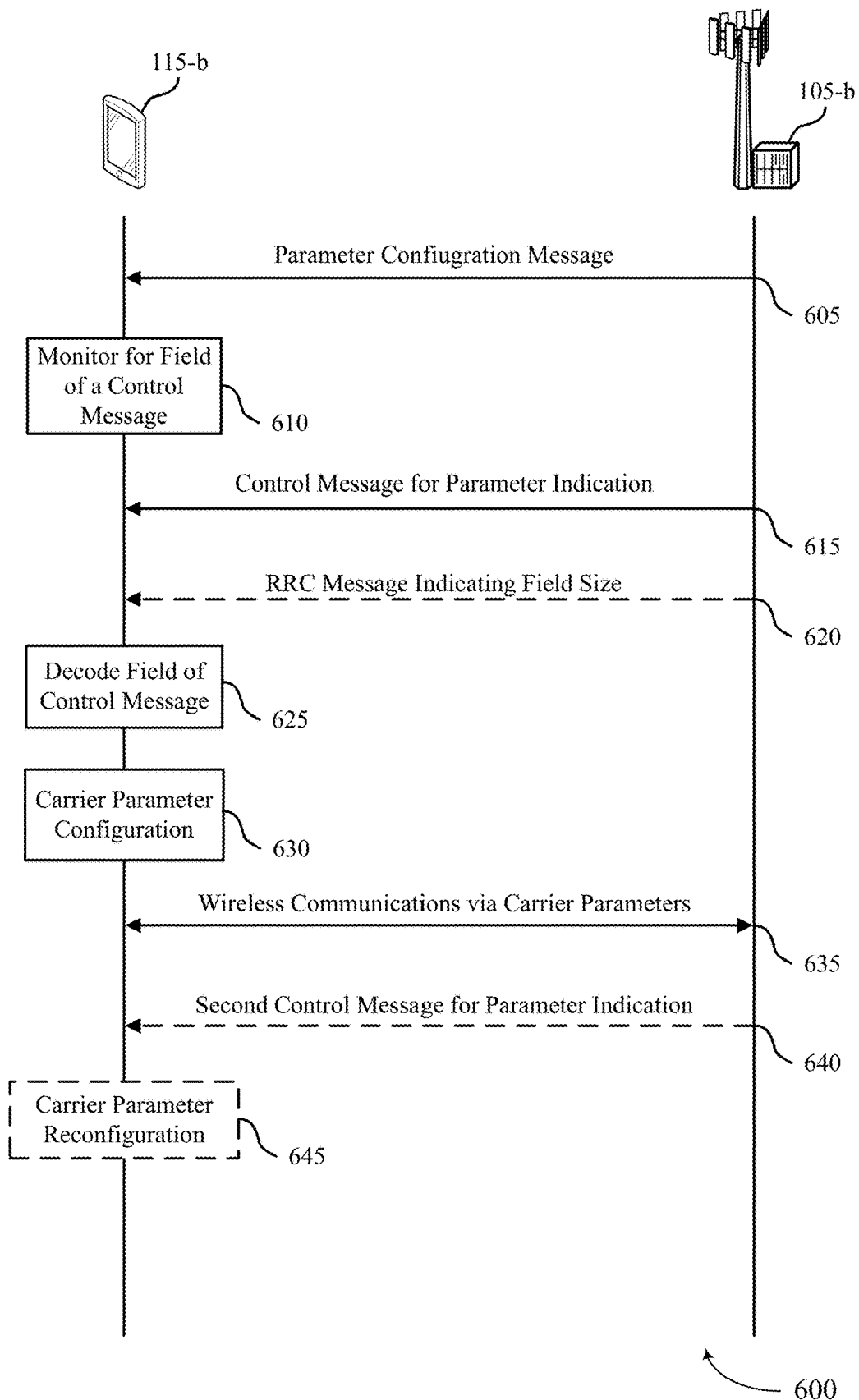
FIG. 6 illustrates an example of a process flow that supports joint indication for multi-cell scheduling in accordance with one or more aspects of the present disclosure.

FIG. 6 illustrates an example of a process flow 600 that supports joint indication for multi-cell scheduling in accordance with one or more aspects of the present disclosure. In some examples, process flow 600 may implement aspects of wireless communications system 100, wireless communications system 200, parameter configurations 300-*a* through 300-*e*, BWP configuration timing diagram 400, BWP configuration timing diagram 500, or a combination thereof. Process flow 600 includes a UE 115-*b* and a network entity 105-*b* which may be respective examples of a UE 115 and a network entity 105, with reference to FIG. 2. Alternative examples of the following may be implemented, where some steps are performed in a different order than described or are not performed at all. In some cases, steps may include additional features not mentioned below, or further steps may be added. In addition, while process flow 600 shows processes between a UE 115 and a network entity 105, it should be understood that these processes may occur between any number of network devices.

At 605, the UE 115-*b* may receive a parameter configuration message. In some examples, the parameter configuration message may indicate one or more sets of parameters for a set of carriers supported by the UE 115-*b*, the one or more sets of parameters indicating communication parameters for communications via the set of carriers. In some examples, each parameter of one or more sets of parameters may be a BWP or a TDRA.

At 610, the UE 115-*b* may monitor for a field of a control message based on the parameter configuration message. In some examples, a field size of the field may be based on the one or more sets of parameters, and a respective value for the field may indicated a respective set of parameters of the one or more sets of parameters for one or more carriers of the set of carriers. Based on monitoring for a field of the control message, at 615, the UE 115-*b* may receive the control message that indicated the respective sets of parameters.

In some examples, at 620, the UE 115-*b* may receive an RRC message indicating a number of bits associated with the field for decoding, where the field size is based on the number of bits.

At 625, the UE 115-*b* may decode the field of the control message. For example, the UE 115-*b* may decode one or more bits of the field of the control message based on the field size, where the field size may be based on a number of parameters associated with a set of parameters of the one or more sets of parameters. In some cases, the UE 115-*b* may determine the field size based on a carrier of the set of carriers, the carrier associated with the set of parameters, where the number of parameters may be greater than respective numbers of parameters for each remaining carrier of the set of carriers. In some cases, the UE 115-*b* may determine the field size based on a carrier of the set of carriers, the carrier associated with the set of parameters, where the number of parameters may be less than respective numbers of parameters for each remaining carrier of the set of carriers.

At 630, the UE 115-*b* may perform a carrier parameter configuration based on the decoded value of the field. In some examples, each value of the field for a first subset of carriers of the set of carriers may indicate at least one respective parameter for each of the first subset of carriers and each value of the field for a second subset of carriers may be associated with a blank value for each of the second subset of the set of carriers, the second subset of carriers excluding the first subset of carriers.

In some examples, the UE 115-*b* may refrain from using a carrier from the second subset of carriers for communicating one or more messages based on the value of the field for the carrier corresponding to the blank value.

In some examples, the UE 115-*b* may communicate using a respective default parameter for each carrier of the second subset of carriers based on the value of the field for each carrier of the second subset of carriers corresponding to the blank value. In such examples, the default parameter may correspond to a zero codepoint field parameter of the respective carrier.

In some examples, the UE 115-*b* may fill blank values for the second subset of carriers for a given value of the field by reusing parameters for the second subset of carriers associated with other values of the field. For example, the UE 115-*b* may recursively fill the blank values of the given carrier by reusing parameters for the given carrier associated with other values of the field. Additionally, or alternatively, the UE 115-*b* may fill a first blank value associated with a first value of the field for the given carrier with a parameter associated with a second value of the field for the given carrier based on the first value of the field sharing one or more common bits with the second value of the field.

In some examples, the UE 115-*b* may monitor for a subset of values of the field from a set of available values of the field, where each of the subset of values includes a respective parameter for each carrier of the set of carriers. In such examples, the UE 115-b may communicate one or more messages based on the field of the control message being a value from the subset of values.

At 635, the UE 115-b may communicate one or more messages via at least one carrier of the set of carriers using the respective set of parameters for the at least one carrier.

In some examples, at 640, the UE 115-b may receive a second control message indicating a change from the one or more sets of parameters to a second one or more sets of parameters available for the set of carriers for the UE 115-b.

In such examples, at 645, the UE 115-b may perform a carrier parameter reconfiguration. For instance, a number of bits associated with the field for the second one or more sets of parameters may be less than a number of bits associated with the field for the one or more sets of parameters. In such instances, the UE 115-b may zero values of the field that may be associated with the one or more sets of parameters and disassociated with the second one or more sets of parameters. Additionally, or alternatively, the number of bits associated with the field for the second one or more sets of parameters may be greater than a number of bits associated with the field for the one or more sets of parameters. In such instances, the UE 115-b may interpret entries of the field for the second one or more sets of parameters using a number of LSBs associated with the one or more sets of parameters.

Figure 7:
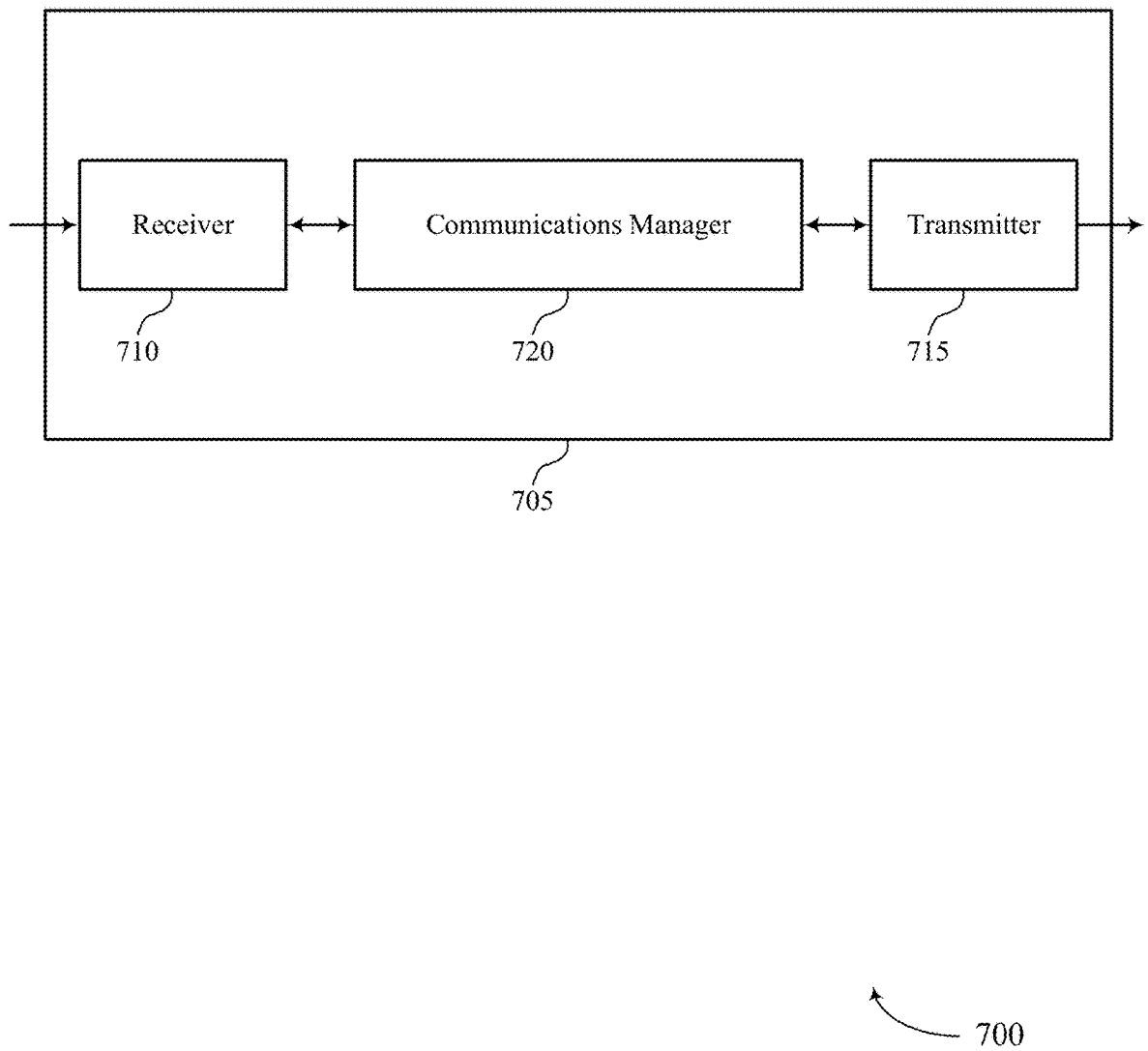
FIGS. 7 and 8 show block diagrams of devices that support joint indication for multi-cell scheduling in accordance with one or more aspects of the present disclosure.

FIG. 7 shows a block diagram 700 of a device 705 that supports joint indication for multi-cell scheduling in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to joint indication for multi-cell scheduling). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to joint indication for multi-cell scheduling). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of joint indication for multi-cell scheduling as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. For example, the communications manager 720 may be configured as or otherwise support a means for receiving a message indicating one or more sets of parameters for a set of carriers supported by the UE, the one or more sets of parameters indicating communication parameters for communications via the set of carriers. The communications manager 720 may be configured as or otherwise support a means for monitoring for a field of a control message based on the message, where a field size of the field is based on the one or more sets of parameters, and where a respective value for the field indicates a respective set of parameters of the one or more sets of parameters for one or more carriers of the set of carriers. The communications manager 720 may be configured as or otherwise support a means for communicating one or more messages via at least one carrier of the set of carriers using the respective set of parameters for the at least one carrier.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for more efficient utilization of communication resources, reduced signaling overhead, and an increase in field decoding reliability.

Figure 8:
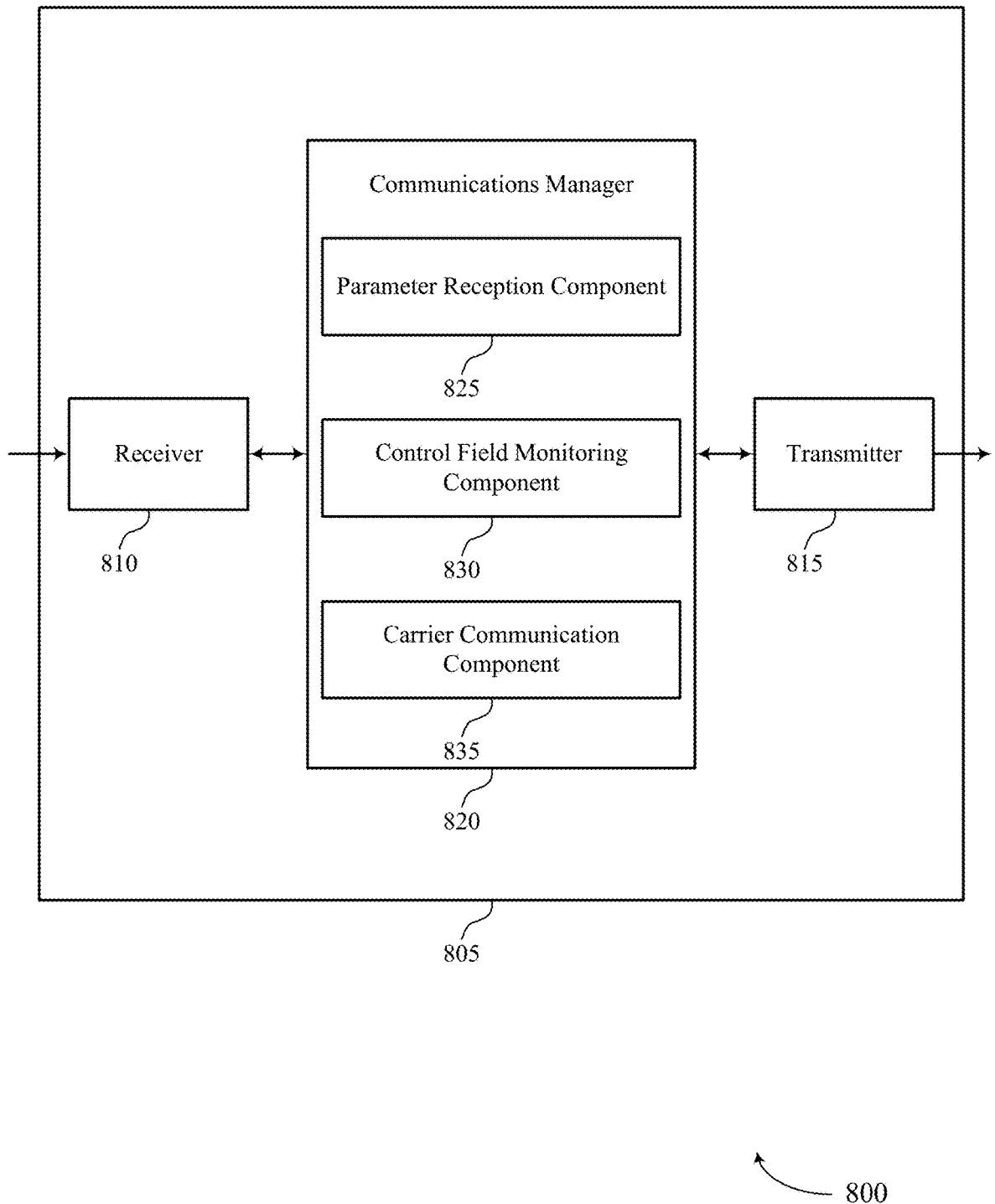

FIG. 8 shows a block diagram 800 of a device 805 that supports joint indication for multi-cell scheduling in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to joint indication for multi-cell scheduling). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to joint indication for multi-cell scheduling). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of joint indication for multi-cell scheduling as described herein. For example, the communications manager 820 may include a parameter reception component 825, a control field monitoring component 830, a carrier communication component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. The parameter reception component 825 may be configured as or otherwise support a means for receiving a message indicating one or more sets of parameters for a set of carriers supported by the UE, the one or more sets of parameters indicating communication parameters for communications via the set of carriers. The control field monitoring component 830 may be configured as or otherwise support a means for monitoring for a field of a control message based on the message, where a field size of the field is based on the one or more sets of parameters, and where a respective value for the field indicates a respective set of parameters of the one or more sets of parameters for one or more carriers of the set of carriers. The carrier communication component 835 may be configured as or otherwise support a means for communicating one or more messages via at least one carrier of the set of carriers using the respective set of parameters for the at least one carrier.

Figure 9:
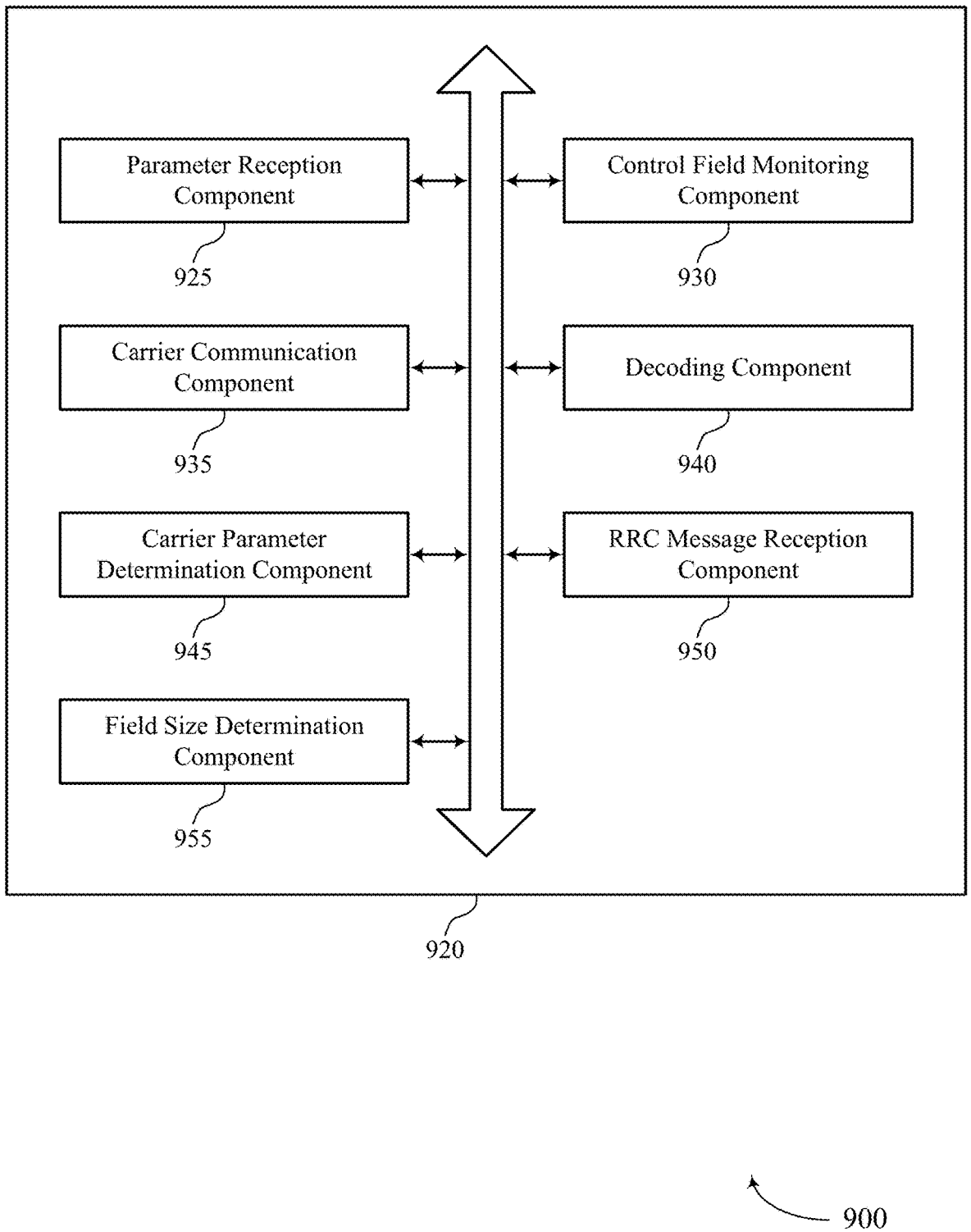
FIG. 9 shows a block diagram of a communications manager that supports joint indication for multi-cell scheduling in accordance with one or more aspects of the present disclosure.

FIG. 9 shows a block diagram 900 of a communications manager 920 that supports joint indication for multi-cell scheduling in accordance with one or more aspects of the present disclosure. The communications manager 920 may be an example of aspects of a communications manager 720, a communications manager 820, or both, as described herein. The communications manager 920, or various components thereof, may be an example of means for performing various aspects of joint indication for multi-cell scheduling as described herein. For example, the communications manager 920 may include a parameter reception component 925, a control field monitoring component 930, a carrier communication component 935, a decoding component 940, a carrier parameter determination component 945, an RRC message reception component 950, a field size determination component 955, or any combination thereof. Each of these components may communicate, directly or indirectly, with one another (e.g., via one or more buses).

The communications manager 920 may support wireless communications in accordance with examples as disclosed herein. The parameter reception component 925 may be configured as or otherwise support a means for receiving a message indicating one or more sets of parameters for a set of carriers supported by the UE, the one or more sets of parameters indicating communication parameters for communications via the set of carriers. The control field monitoring component 930 may be configured as or otherwise support a means for monitoring for a field of a control message based on the message, where a field size of the field is based on the one or more sets of parameters, and where a respective value for the field indicates a respective set of parameters of the one or more sets of parameters for one or more carriers of the set of carriers. The carrier communication component 935 may be configured as or otherwise support a means for communicating one or more messages via at least one carrier of the set of carriers using the respective set of parameters for the at least one carrier.

In some examples, to support monitoring for the field of the control message, the decoding component 940 may be configured as or otherwise support a means for decoding one or more bits of the field of the control message based on the field size, where the field size is based on a number of parameters associated with a set of parameters of the one or more sets of parameters.

In some examples, the field size determination component 955 may be configured as or otherwise support a means for determining the field size based on a carrier of the set of carriers, the carrier associated with the set of parameters, where the number of parameters is greater than respective numbers of parameters for each remaining carrier of the set of carriers.

In some examples, the field size determination component 955 may be configured as or otherwise support a means for determining the field size based on a carrier of the set of carriers, the carrier associated with the set of parameters, where the number of parameters is less than respective numbers of parameters for each remaining carrier of the set of carriers.

In some examples, each value of the field for a first subset of carriers of the set of carriers indicates at least one respective parameter for each of the first subset of carriers, the first subset of carriers including the one or more carriers. In some examples, each value of the field for a second subset of carriers is associated with a blank value for each of the second subset of the set of carriers, the second subset of carriers excluding the first subset of carriers.

In some examples, the carrier parameter determination component 945 may be configured as or otherwise support a means for refraining from using a carrier from the second subset of carriers for communicating the one or more messages based on the value of the field for the carrier corresponding to the blank value.

In some examples, the carrier parameter determination component 945 may be configured as or otherwise support a means for communicating using a respective default parameter for each carrier of the second subset of carriers based on the value of the field for each carrier of the second subset of carriers corresponding to the blank value.

In some examples, each respective default parameter corresponds to a zero codepoint field parameter of the respective carrier.

In some examples, the carrier parameter determination component 945 may be configured as or otherwise support a means for filling blank values for the second subset of carriers for a given value of the field by reusing parameters for the second subset of carriers associated with other values of the field.

In some examples, to support filling blank values for a given carrier of the second subset of carriers, the carrier parameter determination component 945 may be configured as or otherwise support a means for recursively filling the blank values of the given carrier by reusing parameters for the given carrier associated with other values of the field.

In some examples, to support filling blank values for a given carrier of the second subset of carriers, the carrier parameter determination component 945 may be configured as or otherwise support a means for filling a first blank value associated with a first value of the field for the given carrier with a parameter associated with a second value of the field for the given carrier based on the first value of the field sharing one or more common bits with the second value of the field.

In some examples, the control field monitoring component 930 may be configured as or otherwise support a means for monitoring for a subset of values of the field from a set of available values of the field, where each of the subset of values includes a respective parameter for each carrier of the set of carriers. In some examples, the carrier communication component 935 may be configured as or otherwise support a means for communicating the one or more messages based on the field of the control message being a value from the subset of values.

In some examples, the RRC message reception component 950 may be configured as or otherwise support a means for receiving a radio resource control message indicating a number of bits associated with the field for decoding, where the field size is based on the number of bits.

In some examples, the parameter reception component 925 may be configured as or otherwise support a means for receiving a second control message indicating a change from the one or more sets of parameters to a second one or more sets of parameters available for the set of carriers for the UE.

In some examples, a number of bits associated with the field for the second one or more sets of parameters is less than a number of bits associated with the field for the one or more sets of parameters.

In some examples, the field size determination component 955 may be configured as or otherwise support a means for zeroing values of the field that are associated with the one or more sets of parameters and disassociated with the second one or more sets of parameters.

In some examples, a number of bits associated with the field for the second one or more sets of parameters is greater than a number of bits associated with the field for the one or more sets of parameters.

In some examples, the field size determination component 955 may be configured as or otherwise support a means for interpreting entries of the field for the second one or more sets of parameters using a number of LSBs associated with the one or more sets of parameters.

In some examples, each parameter of one or more sets of parameters includes a BWP or a TDRA.

Figure 10:
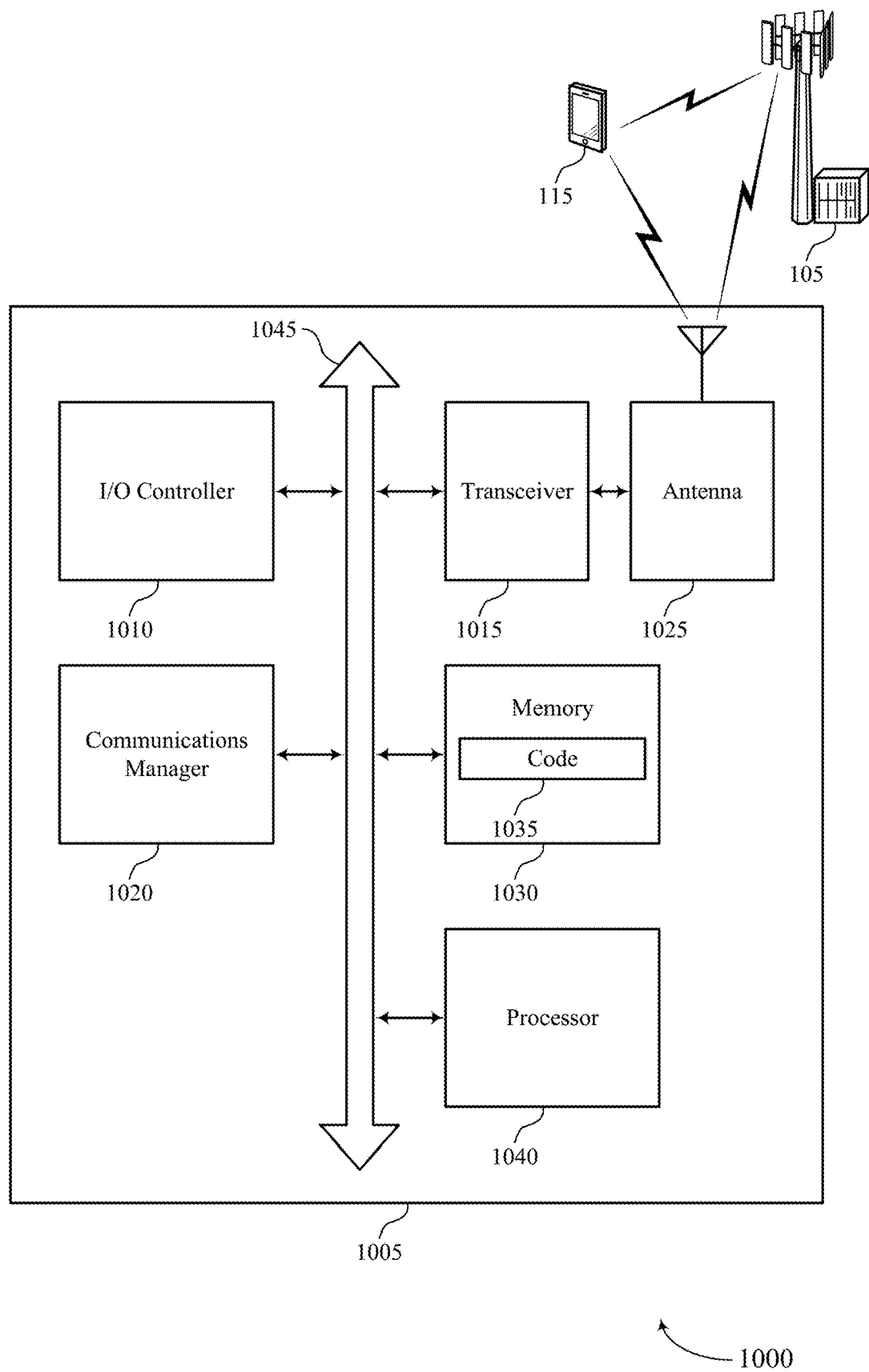
FIG. 10 shows a diagram of a system including a device that supports joint indication for multi-cell scheduling in accordance with one or more aspects of the present disclosure.

FIG. 10 shows a diagram of a system 1000 including a device 1005 that supports joint indication for multi-cell scheduling in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting joint indication for multi-cell scheduling). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications in accordance with examples as disclosed herein. For example, the communications manager 1020 may be configured as or otherwise support a means for receiving a message indicating one or more sets of parameters for a set of carriers supported by the UE, the one or more sets of parameters indicating communication parameters for communications via the set of carriers. The communications manager 1020 may be configured as or otherwise support a means for monitoring for a field of a control message based on the message, where a field size of the field is based on the one or more sets of parameters, and where a respective value for the field indicates a respective set of parameters of the one or more sets of parameters for one or more carriers of the set of carriers. The communications manager 1020 may be configured as or otherwise support a means for communicating one or more messages via at least one carrier of the set of carriers using the respective set of parameters for the at least one carrier.

By including or configuring the communications manager 1020 in accordance with examples as described herein, the device 1005 may support techniques for more efficient utilization of communication resources, reduced signaling overhead, improved communication reliability, improved coordination between devices, reduced latency, and an increase in field decoding reliability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of joint indication for multi-cell scheduling as described herein, or the processor 1040 and the memory 1030 may be otherwise configured to perform or support such operations.

Figure 11:
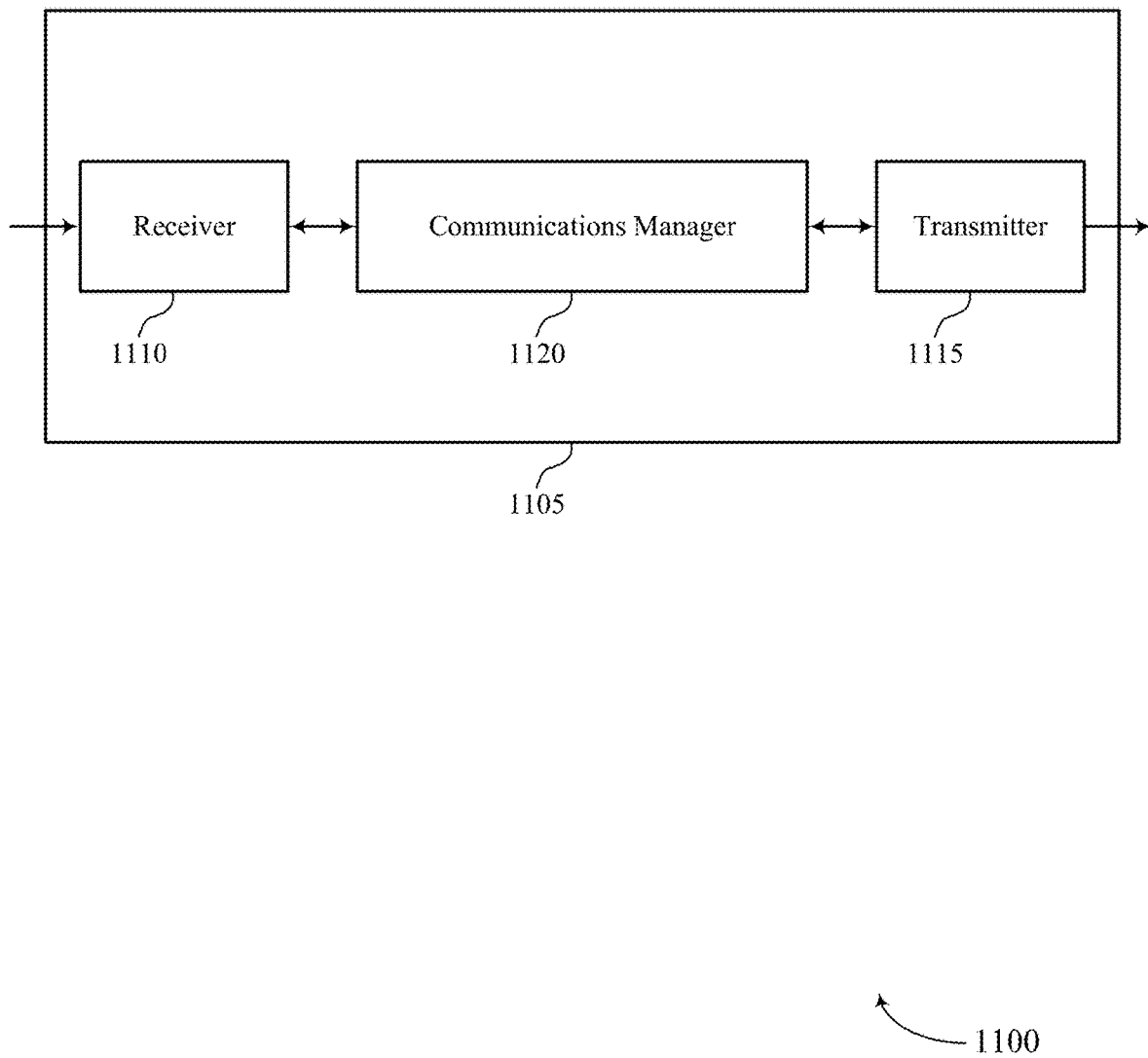
FIGS. 11 and 12 show block diagrams of devices that support joint indication for multi-cell scheduling in accordance with one or more aspects of the present disclosure.

FIG. 11 shows a block diagram 1100 of a device 1105 that supports joint indication for multi-cell scheduling in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of joint indication for multi-cell scheduling as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. For example, the communications manager 1120 may be configured as or otherwise support a means for transmitting a message indicating one or more sets of parameters for a set of carriers supported by a UE, the one or more sets of parameters indicating communication parameters for communications via the set of carriers. The communications manager 1120 may be configured as or otherwise support a means for transmitting a control message via a carrier of the set of carriers based on the message, where a field size associated with a field of the control message is based on the one or more sets of parameters, where a respective value of the field indicates a respective set of parameters of the one or more sets of parameters for one or more carriers of the set of carriers. The communications manager 1120 may be configured as or otherwise support a means for communicating one or more messages via at least one carrier of the set of carriers using the respective set of parameters for the at least one carrier.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for more efficient utilization of communication resources, reduced signaling overhead, and an increase in field decoding reliability.

Figure 12:
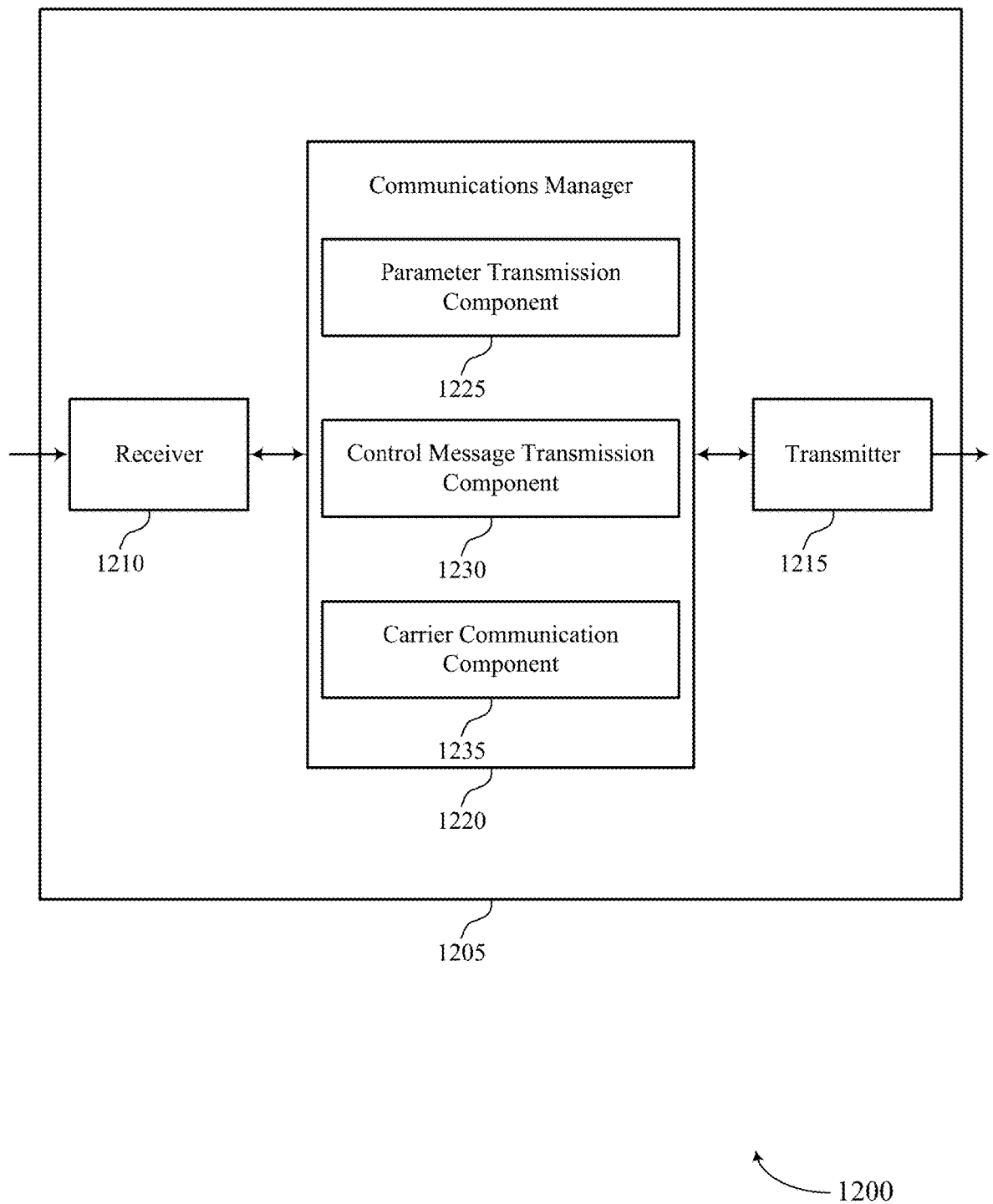

FIG. 12 shows a block diagram 1200 of a device 1205 that supports joint indication for multi-cell scheduling in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of joint indication for multi-cell scheduling as described herein. For example, the communications manager 1220 may include a parameter transmission component 1225, a control message transmission component 1230, a carrier communication component 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications in accordance with examples as disclosed herein. The parameter transmission component 1225 may be configured as or otherwise support a means for transmitting a message indicating one or more sets of parameters for a set of carriers supported by a UE, the one or more sets of parameters indicating communication parameters for communications via the set of carriers. The control message transmission component 1230 may be configured as or otherwise support a means for transmitting a control message via a carrier of the set of carriers based on the message, where a field size associated with a field of the control message is based on the one or more sets of parameters, where a respective value of the field indicates a respective set of parameters of the one or more sets of parameters for one or more carriers of the set of carriers. The carrier communication component 1235 may be configured as or otherwise support a means for communicating one or more messages via at least one carrier of the set of carriers using the respective set of parameters for the at least one carrier.

Figure 13:
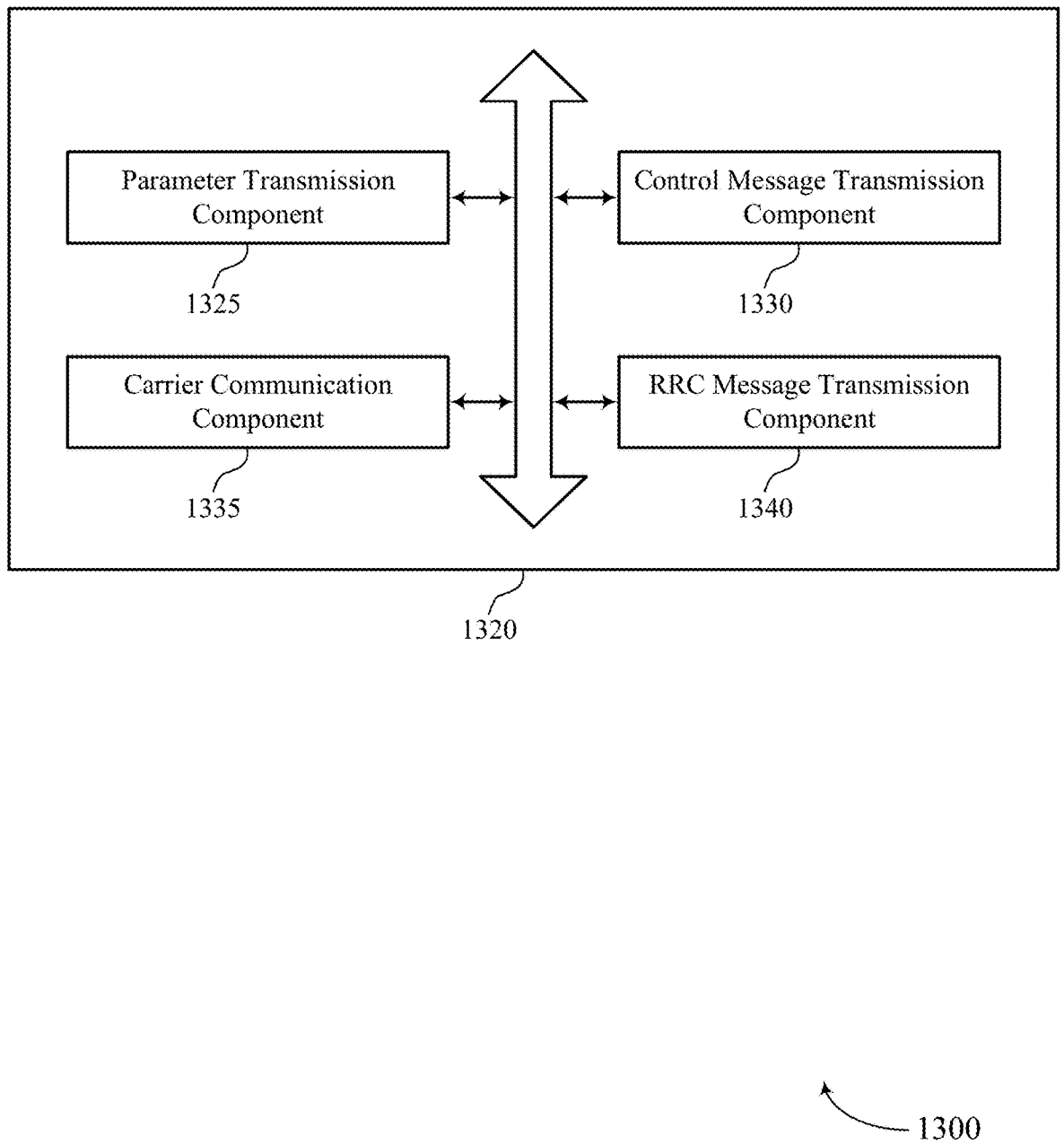
FIG. 13 shows a block diagram of a communications manager that supports joint indication for multi-cell scheduling in accordance with one or more aspects of the present disclosure.

FIG. 13 shows a block diagram 1300 of a communications manager 1320 that supports joint indication for multi-cell scheduling in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of joint indication for multi-cell scheduling as described herein. For example, the communications manager 1320 may include a parameter transmission component 1325, a control message transmission component 1330, a carrier communication component 1335, an RRC message transmission component 1340, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications in accordance with examples as disclosed herein. The parameter transmission component 1325 may be configured as or otherwise support a means for transmitting a message indicating one or more sets of parameters for a set of carriers supported by a UE, the one or more sets of parameters indicating communication parameters for communications via the set of carriers. The control message transmission component 1330 may be configured as or otherwise support a means for transmitting a control message via a carrier of the set of carriers based on the message, where a field size associated with a field of the control message is based on the one or more sets of parameters, where a respective value of the field indicates a respective set of parameters of the one or more sets of parameters for one or more carriers of the set of carriers. The carrier communication component 1335 may be configured as or otherwise support a means for communicating one or more messages via at least one carrier of the set of carriers using the respective set of parameters for the at least one carrier.

In some examples, the RRC message transmission component 1340 may be configured as or otherwise support a means for transmitting a radio resource control message indicating a number of bits associated with the field, where the field size is based on the number of bits.

In some examples, the control message transmission component 1330 may be configured as or otherwise support a means for transmitting a second control message indicating a change from the one or more sets of parameters available for the set of carriers for the UE to a second one or more sets of parameters available for the set of carriers for the UE.

In some examples, a number of bits associated with the field for the second one or more sets of parameters is less than a number of bits associated with the field for the one or more sets of parameters.

In some examples, a number of bits associated with the field for the second one or more sets of parameters is greater than a number of bits associated with the field for the one or more sets of parameters.

In some examples, each parameter of one or more sets of parameters includes a bandwidth part or a TDRA.

Figure 14:
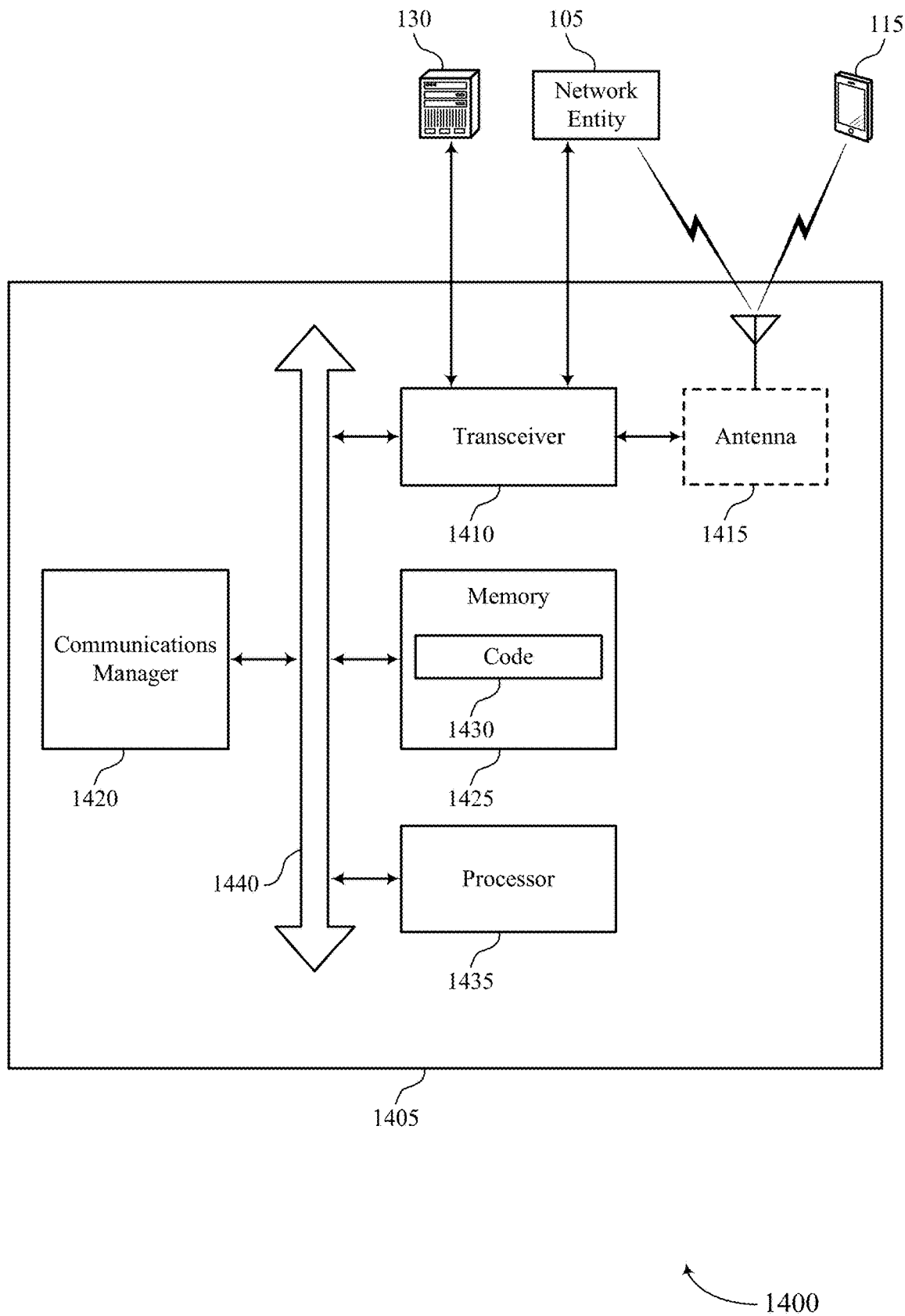
FIG. 14 shows a diagram of a system including a device that supports joint indication for multi-cell scheduling in accordance with one or more aspects of the present disclosure.

FIG. 14 shows a diagram of a system 1400 including a device 1405 that supports joint indication for multi-cell scheduling in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting joint indication for multi-cell scheduling). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications in accordance with examples as disclosed herein. For example, the communications manager 1420 may be configured as or otherwise support a means for transmitting a message indicating one or more sets of parameters for a set of carriers supported by a UE, the one or more sets of parameters indicating communication parameters for communications via the set of carriers. The communications manager 1420 may be configured as or otherwise support a means for transmitting a control message via a carrier of the set of carriers based on the message, where a field size associated with a field of the control message is based on the one or more sets of parameters, where a respective value of the field indicates a respective set of parameters of the one or more sets of parameters for one or more carriers of the set of carriers. The communications manager 1420 may be configured as or otherwise support a means for communicating one or more messages via at least one carrier of the set of carriers using the respective set of parameters for the at least one carrier.

By including or configuring the communications manager 1420 in accordance with examples as described herein, the device 1405 may support techniques for may support techniques for more efficient utilization of communication resources, reduced signaling overhead, improved communication reliability, improved coordination between devices, reduced latency, and an increase in field decoding reliability.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of joint indication for multi-cell scheduling as described herein, or the processor 1435 and the memory 1425 may be otherwise configured to perform or support such operations.

Figure 15:
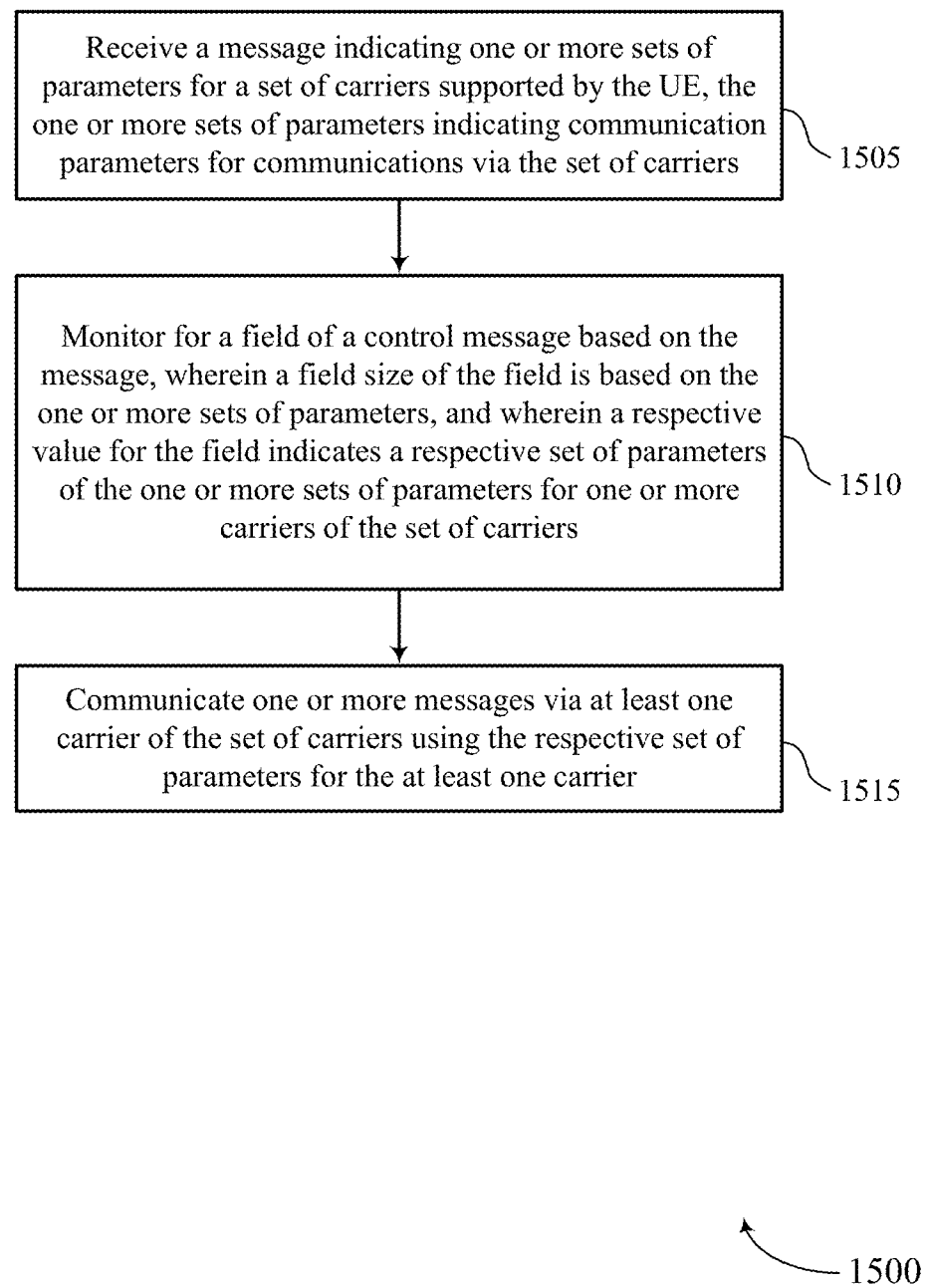
FIGS. 15 through 18 show flowcharts illustrating methods that support joint indication for multi-cell scheduling in accordance with one or more aspects of the present disclosure.

FIG. 15 shows a flowchart illustrating a method 1500 that supports joint indication for multi-cell scheduling in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving a message indicating one or more sets of parameters for a set of carriers supported by the UE, the one or more sets of parameters indicating communication parameters for communications via the set of carriers. The operations of 1505 may be performed in accordance with examples as disclosed herein. In some examples, aspects of the operations of 1505 may be performed by a parameter reception component 925 as described with reference to FIG. 9.

At 1510, the method may include monitoring for a field of a control message based on the message, where a field size of the field is based on the one or more sets of parameters, and where a respective value for the field indicates a respective set of parameters of the one or more sets of parameters for one or more carriers of the set of carriers. The operations of 1510 may be performed in accordance with examples as disclosed herein. In some examples, aspects of the operations of 1510 may be performed by a control field monitoring component 930 as described with reference to FIG. 9.

At 1515, the method may include communicating one or more messages via at least one carrier of the set of carriers using the respective set of parameters for the at least one carrier. The operations of 1515 may be performed in accordance with examples as disclosed herein. In some examples, aspects of the operations of 1515 may be performed by a carrier communication component 935 as described with reference to FIG. 9.

Figure 16:
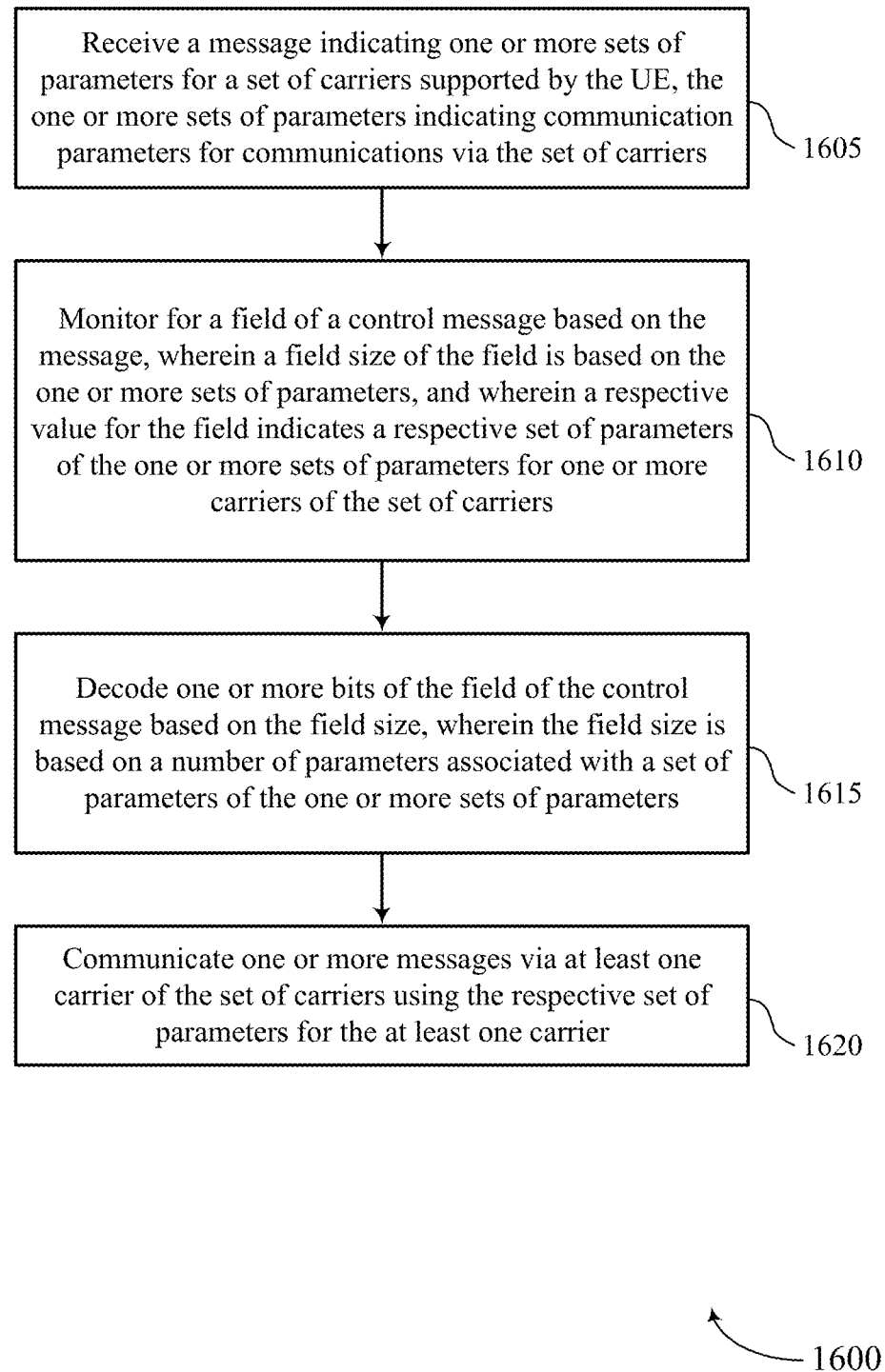

FIG. 16 shows a flowchart illustrating a method 1600 that supports joint indication for multi-cell scheduling in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving a message indicating one or more sets of parameters for a set of carriers supported by the UE, the one or more sets of parameters indicating communication parameters for communications via the set of carriers. The operations of 1605 may be performed in accordance with examples as disclosed herein. In some examples, aspects of the operations of 1605 may be performed by a parameter reception component 925 as described with reference to FIG. 9.

At 1610, the method may include monitoring for a field of a control message based on the message, where a field size of the field is based on the one or more sets of parameters, and where a respective value for the field indicates a respective set of parameters of the one or more sets of parameters for one or more carriers of the set of carriers. The operations of 1610 may be performed in accordance with examples as disclosed herein. In some examples, aspects of the operations of 1610 may be performed by a control field monitoring component 930 as described with reference to FIG. 9.

At 1615, the method may include decoding one or more bits of the field of the control message based on the field size, where the field size is based on a number of parameters associated with a set of parameters of the one or more sets of parameters. The operations of 1615 may be performed in accordance with examples as disclosed herein. In some examples, aspects of the operations of 1615 may be performed by a decoding component 940 as described with reference to FIG. 9.

At 1620, the method may include communicating one or more messages via at least one carrier of the set of carriers using the respective set of parameters for the at least one carrier. The operations of 1620 may be performed in accordance with examples as disclosed herein. In some examples, aspects of the operations of 1620 may be performed by a carrier communication component 935 as described with reference to FIG. 9.

Figure 17:
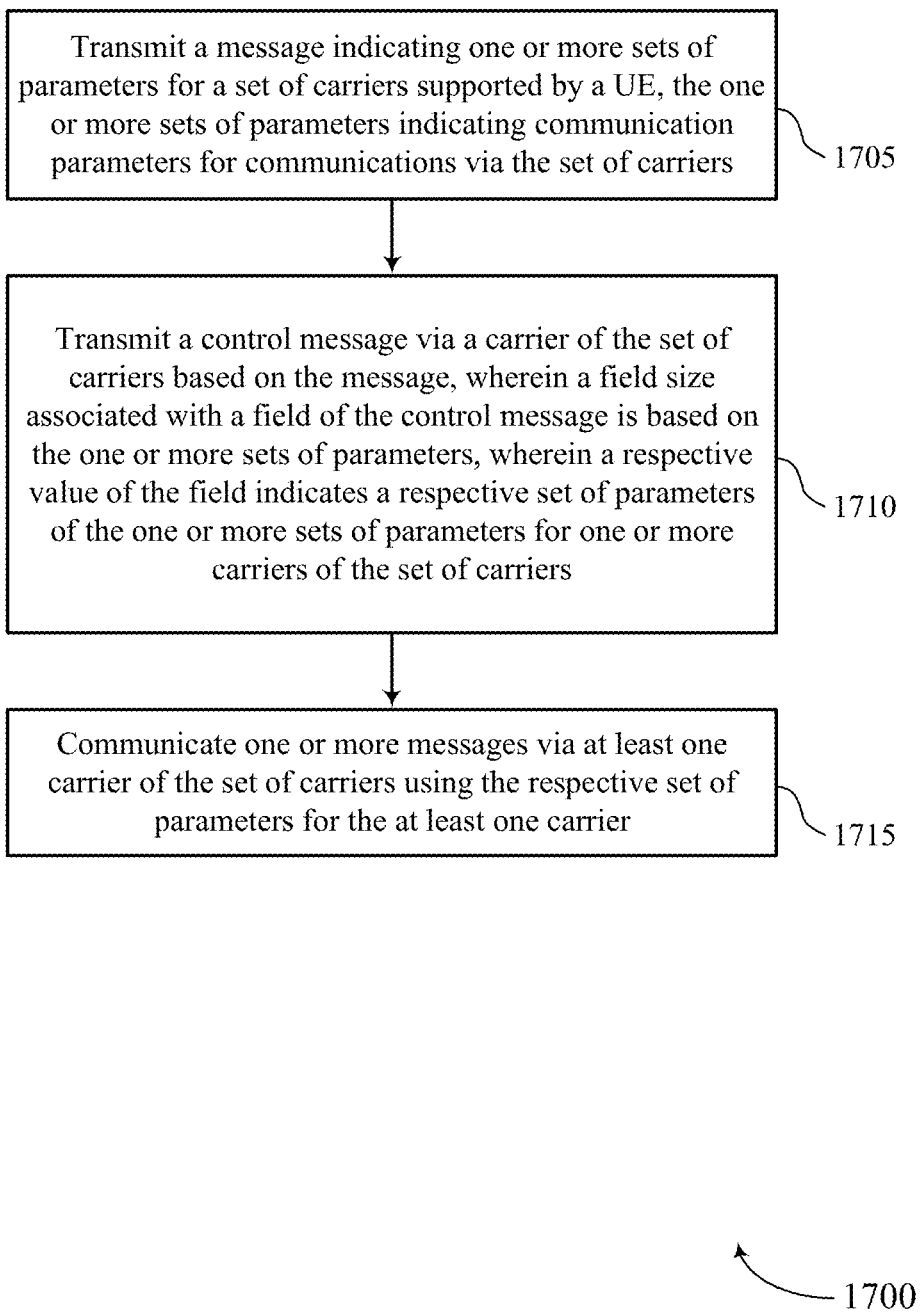

FIG. 17 shows a flowchart illustrating a method 1700 that supports joint indication for multi-cell scheduling in accordance with one or more aspects of the present disclosure. The operations of the method 1700 may be implemented by a network entity or its components as described herein. For example, the operations of the method 1700 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1705, the method may include transmitting a message indicating one or more sets of parameters for a set of carriers supported by a UE, the one or more sets of parameters indicating communication parameters for communications via the set of carriers. The operations of 1705 may be performed in accordance with examples as disclosed herein. In some examples, aspects of the operations of 1705 may be performed by a parameter transmission component 1325 as described with reference to FIG. 13.

At 1710, the method may include transmitting a control message via a carrier of the set of carriers based on the message, where a field size associated with a field of the control message is based on the one or more sets of parameters, where a respective value of the field indicates a respective set of parameters of the one or more sets of parameters for one or more carriers of the set of carriers. The operations of 1710 may be performed in accordance with examples as disclosed herein. In some examples, aspects of the operations of 1710 may be performed by a control message transmission component 1330 as described with reference to FIG. 13.

At 1715, the method may include communicating one or more messages via at least one carrier of the set of carriers using the respective set of parameters for the at least one carrier. The operations of 1715 may be performed in accordance with examples as disclosed herein. In some examples, aspects of the operations of 1715 may be performed by a carrier communication component 1335 as described with reference to FIG. 13.

Figure 18:
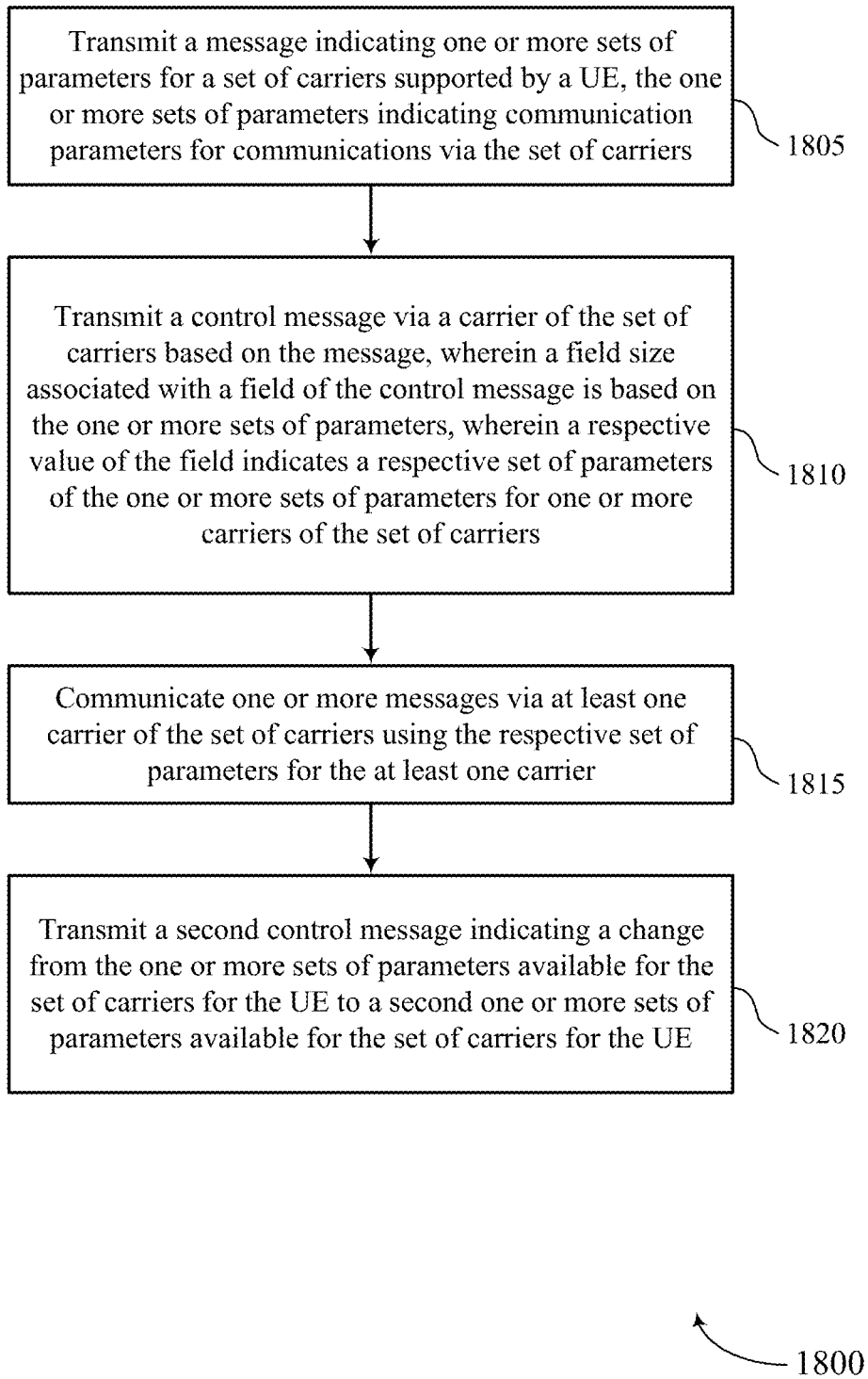

FIG. 18 shows a flowchart illustrating a method 1800 that supports joint indication for multi-cell scheduling in accordance with one or more aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include transmitting a message indicating one or more sets of parameters for a set of carriers supported by a UE, the one or more sets of parameters indicating communication parameters for communications via the set of carriers. The operations of 1805 may be performed in accordance with examples as disclosed herein. In some examples, aspects of the operations of 1805 may be performed by a parameter transmission component 1325 as described with reference to FIG. 13.

At 1810, the method may include transmitting a control message via a carrier of the set of carriers based on the message, where a field size associated with a field of the control message is based on the one or more sets of parameters, where a respective value of the field indicates a respective set of parameters of the one or more sets of parameters for one or more carriers of the set of carriers. The operations of 1810 may be performed in accordance with examples as disclosed herein. In some examples, aspects of the operations of 1810 may be performed by a control message transmission component 1330 as described with reference to FIG. 13.

At 1815, the method may include communicating one or more messages via at least one carrier of the set of carriers using the respective set of parameters for the at least one carrier. The operations of 1815 may be performed in accordance with examples as disclosed herein. In some examples, aspects of the operations of 1815 may be performed by a carrier communication component 1335 as described with reference to FIG. 13.

At 1820, the method may include transmitting a second control message indicating a change from the one or more sets of parameters available for the set of carriers for the UE to a second one or more sets of parameters available for the set of carriers for the UE. The operations of 1820 may be performed in accordance with examples as disclosed herein. In some examples, aspects of the operations of 1820 may be performed by a control message transmission component 1330 as described with reference to FIG. 13.

The following provides an overview of aspects of the present disclosure:

Aspect 1: A method for wireless communications, at a UE, comprising: receiving a message indicating one or more sets of parameters for a set of carriers supported by the UE, the one or more sets of parameters indicating communication parameters for communications via the set of carriers; monitoring for a field of a control message based at least in part on the message, wherein a field size of the field is based at least in part on the one or more sets of parameters, and wherein a respective value for the field indicates a respective set of parameters of the one or more sets of parameters for one or more carriers of the set of carriers; and communicating one or more messages via at least one carrier of the set of carriers using the respective set of parameters for the at least one carrier.

Aspect 2: The method of aspect 1, wherein monitoring for the field of the control message comprises: decoding one or more bits of the field of the control message based at least in part on the field size, wherein the field size is based at least in part on a number of parameters associated with a set of parameters of the one or more sets of parameters.

Aspect 3: The method of aspect 2, further comprising: determining the field size based at least in part on a carrier of the set of carriers, the carrier associated with the set of parameters, wherein the number of parameters is greater than respective numbers of parameters for each remaining carrier of the set of carriers.

Aspect 4: The method of any of aspects 2 through 3, further comprising: determining the field size based at least in part on a carrier of the set of carriers, the carrier associated with the set of parameters, wherein the number of parameters is less than respective numbers of parameters for each remaining carrier of the set of carriers.

Aspect 5: The method of any of aspects 1 through 4, wherein each value of the field for a first subset of carriers of the set of carriers indicates at least one respective parameter for each of the first subset of carriers, the first subset of carriers comprising the one or more carriers; and each value of the field for a second subset of carriers is associated with a blank value for each of the second subset of the set of carriers, the second subset of carriers excluding the first subset of carriers.

Aspect 6: The method of aspect 5, further comprising: refraining from using a carrier from the second subset of carriers for communicating the one or more messages based at least in part on the value of the field for the carrier corresponding to the blank value.

Aspect 7: The method of any of aspects 5 through 6, further comprising: communicating using a respective default parameter for each carrier of the second subset of carriers based at least in part on the value of the field for each carrier of the second subset of carriers corresponding to the blank value.

Aspect 8: The method of aspect 7, wherein each respective default parameter corresponds to a zero codepoint field parameter of the respective carrier.

Aspect 9: The method of any of aspects 5 through 8, further comprising: filling blank values for the second subset of carriers for a given value of the field by reusing parameters for the second subset of carriers associated with other values of the field.

Aspect 10: The method of aspect 9, wherein filling blank values for a given carrier of the second subset of carriers comprises: recursively filling the blank values of the given carrier by reusing parameters for the given carrier associated with other values of the field.

Aspect 11: The method of any of aspects 9 through 10, wherein filling blank values for a given carrier of the second subset of carriers comprises: filling a first blank value associated with a first value of the field for the given carrier with a parameter associated with a second value of the field for the given carrier based at least in part on the first value of the field sharing one or more common bits with the second value of the field.

Aspect 12: The method of any of aspects 5 through 11, further comprising: monitoring for a subset of values of the field from a set of available values of the field, wherein each of the subset of values comprises a respective parameter for each carrier of the set of carriers; and communicating the one or more messages based at least in part on the field of the control message being a value from the subset of values.

Aspect 13: The method of any of aspects 1 through 12, further comprising: receiving a radio resource control message indicating a number of bits associated with the field for decoding, wherein the field size is based at least in part on the number of bits.

Aspect 14: The method of any of aspects 1 through 13, further comprising: receiving a second control message indicating a change from the one or more sets of parameters to a second one or more sets of parameters available for the set of carriers for the UE.

Aspect 15: The method of aspect 14, wherein a number of bits associated with the field for the second one or more sets of parameters is less than a number of bits associated with the field for the one or more sets of parameters.

Aspect 16: The method of aspect 15, further comprising: zeroing values of the field that are associated with the one or more sets of parameters and disassociated with the second one or more sets of parameters.

Aspect 17: The method of any of aspects 14 through 16, wherein a number of bits associated with the field for the second one or more sets of parameters is greater than a number of bits associated with the field for the one or more sets of parameters.

Aspect 18: The method of aspect 17, further comprising: interpreting entries of the field for the second one or more sets of parameters using a number of least significant bits associated with the one or more sets of parameters.

Aspect 19: The method of any of aspects 1 through 18, wherein each parameter of one or more sets of parameters comprises a BWP or a TDRA.

Aspect 20: A method for wireless communications, at a network entity, comprising: transmitting a message indicating one or more sets of parameters for a set of carriers supported by a UE, the one or more sets of parameters indicating communication parameters for communications via the set of carriers; transmitting a control message via a carrier of the set of carriers based at least in part on the message, wherein a field size associated with a field of the control message is based at least in part on the one or more sets of parameters, wherein a respective value of the field indicates a respective set of parameters of the one or more sets of parameters for one or more carriers of the set of carriers; and communicating one or more messages via at least one carrier of the set of carriers using the respective set of parameters for the at least one carrier.

Aspect 21: The method of aspect 20, further comprising: transmitting a radio resource control message indicating a number of bits associated with the field, wherein the field size is based at least in part on the number of bits.

Aspect 22: The method of any of aspects 20 through 21, further comprising: transmitting a second control message indicating a change from the one or more sets of parameters available for the set of carriers for the UE to a second one or more sets of parameters available for the set of carriers for the UE.

Aspect 23: The method of aspect 22, wherein a number of bits associated with the field for the second one or more sets of parameters is less than a number of bits associated with the field for the one or more sets of parameters.

Aspect 24: The method of any of aspects 22 through 23, wherein a number of bits associated with the field for the second one or more sets of parameters is greater than a number of bits associated with the field for the one or more sets of parameters.

Aspect 25: The method of any of aspects 20 through 24, wherein each parameter of one or more sets of parameters comprises a BWP or a TDRA.

Aspect 26: An apparatus for wireless communications, comprising a processor; memory coupled with the processor; and instructions stored in the memory and executable by the processor to cause the apparatus to perform a method of any of aspects 1 through 19.

Aspect 27: An apparatus for wireless communications, comprising at least one means for performing a method of any of aspects 1 through 19.

Aspect 28: A non-transitory computer-readable medium storing code for wireless communications, the code comprising instructions executable by a processor to perform a method of any of aspects 1 through 19.

Aspect 29: An apparatus for wireless communications, comprising a processor; memory coupled with the processor; and instructions stored in the memory and executable by the processor to cause the apparatus to perform a method of any of aspects 20 through 25.

Aspect 30: An apparatus for wireless communications, comprising at least one means for performing a method of any of aspects 20 through 25.

Aspect 31: A non-transitory computer-readable medium storing code for wireless communications, the code comprising instructions executable by a processor to perform a method of any of aspects 20 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications, at a user equipment (UE), comprising:
    receiving a configuration message indicating one or more sets of parameters for a set of cells supported by the UE, the one or more sets of parameters indicating at least a respective quantity of bandwidth parts associated with each cell of the set of cells;
    receiving a downlink control information message comprising a plurality of fields, the plurality of fields including a field, wherein a field size of the field includes two or fewer bits and is based at least in part on a maximum quantity of bandwidth parts configured across each cell of the set of cells supported by the UE, and wherein respective bit values of the field indicate a respective set of parameters of the one or more sets of parameters for one or more cells of the set of cells; and
    communicating one or more messages via at least one cell of the set of cells using the respective set of parameters for the at least one cell.

2. The method of claim 1, wherein monitoring for the field of the downlink control information message comprises:
    decoding one or more bits of the field of the downlink control information message based at least in part on the field size, wherein the field size is based at least in part on a quantity of parameters associated with a set of parameters of the one or more sets of parameters.

3. The method of claim 2, further comprising:
    determining the field size based at least in part on a cell of the set of cells, the cell associated with the set of parameters, wherein the quantity of parameters is greater than respective quantities of parameters for each remaining cell of the set of cells.

4. The method of claim 2, further comprising:
    determining the field size based at least in part on a cell of the set of cells, the cell associated with the set of parameters, wherein the quantity of parameters is less than respective quantities of parameters for each remaining cell of the set of cells.

5. The method of claim 1, wherein:
    each value of the field for a first subset of cells of the set of cells indicates at least one respective parameter for each of the first subset of cells, the first subset of cells comprising the one or more cells; and
    each value of the field for a second subset of cells of the set of cells is associated with a blank value for each of the second subset of cells, the second subset of cells excluding the first subset of cells.

6. The method of claim 5, further comprising:
    refraining from using a cell from the second subset of cells for communicating the one or more messages based at least in part on each value of the field for the cell corresponding to the blank value.

7. The method of claim 1, further comprising:
    communicating using a respective default parameter for each cell of a subset of cells based at least in part on each value of the field for each cell of the subset of cells corresponding to a blank value.

8. The method of claim 7, wherein each respective default parameter corresponds to a zero codepoint field parameter of a respective cell.

9. The method of claim 5, further comprising:
    filling blank values for the second subset of cells for a given value of the field by reusing parameters for the second subset of cells associated with other values of the field.

10. The method of claim 9, wherein filling the blank values for a given cell of the second subset of cells comprises:
    recursively filling the blank values of the given cell by reusing the parameters for the given cell associated with the other values of the field.

11. The method of claim 9, wherein filling the blank values for a given cell of the second subset of cells comprises:
    filling a first blank value associated with a first value of the field for the given cell with a parameter associated with a second value of the field for the given cell based at least in part on the first value of the field sharing one or more common bits with the second value of the field.

12. The method of claim 5, further comprising:
    monitoring for a subset of values of the field from a set of available values of the field, wherein each of the subset of values comprises a respective parameter for each cell of the set of cells; and
    communicating the one or more messages based at least in part on the field of the downlink control information message being a value from the subset of values.

13. The method of claim 1, further comprising:
    receiving a radio resource control message indicating a quantity of bits associated with the field for decoding, wherein the field size is based at least in part on the quantity of bits.

14. The method of claim 1, further comprising:
    receiving a second control message indicating a change from the one or more sets of parameters to a second one or more sets of parameters available for the set of cells for the UE.

15. The method of claim 14, wherein a second quantity of bits associated with the field for the second one or more sets of parameters is less than a first quantity of bits associated with the field for the one or more sets of parameters.

16. The method of claim 15, further comprising:
zeroing values of the field that are associated with the one or more sets of parameters and disassociated with the second one or more sets of parameters.

17. The method of claim 14, wherein a second quantity of bits associated with the field for the second one or more sets of parameters is greater than a first quantity of bits associated with the field for the one or more sets of parameters.

18. The method of claim 17, further comprising:
interpreting entries of the field for the second one or more sets of parameters using a quantity of least significant bits associated with the one or more sets of parameters.

19. The method of claim 1, wherein each parameter of the one or more sets of parameters comprises a bandwidth part or a time domain resource assignment.

20. A method for wireless communications at a network entity, comprising:
transmitting a configuration message indicating one or more sets of parameters for a set of cells supported by a user equipment (UE), the one or more sets of parameters indicating at least a respective quantity of bandwidth parts associated with each cell of the set of cells;
transmitting a downlink control information message comprising a field via a cell of the set of cells based at least in part on the configuration message, wherein a field size of the field includes two or fewer bits and is based at least in part on a maximum quantity of bandwidth parts configured across each cell of the set of cells supported by the UE, and wherein respective bit values of the field indicate a respective set of parameters of the one or more sets of parameters for one or more cells of the set of cells; and
communicating one or more messages via at least one cell of the set of cells using the respective set of parameters for the at least one cell.

21. The method of claim 20, further comprising:
transmitting a radio resource control message indicating a quantity of bits associated with the field, wherein the field size is based at least in part on the quantity of bits.

22. The method of claim 20, further comprising:
transmitting a second downlink control information message indicating a change from the one or more sets of parameters available for the set of cells for the UE to a second one or more sets of parameters available for the set of cells for the UE.

23. The method of claim 22, wherein a second quantity of bits associated with the field for the second one or more sets of parameters is less than a first quantity of bits associated with the field for the one or more sets of parameters.

24. The method of claim 22, wherein a second quantity of bits associated with the field for the second one or more sets of parameters is greater than a first quantity of bits associated with the field for the one or more sets of parameters.

25. The method of claim 20, wherein each parameter of the one or more sets of parameters comprises a bandwidth part or a time domain resource assignment.

26. An apparatus for wireless communications, comprising:
one or more processors;
one or more memories coupled with the one or more processors; and
instructions stored in the one or more memories and executable by the one or more processors to cause the apparatus to:
receive a configuration message indicating one or more sets of parameters for a set of cells supported by a user equipment (UE), the one or more sets of parameters indicating at least a respective quantity of bandwidth parts associated with each cell of the set of cells;
receive a downlink control information message comprising a plurality of fields, the plurality of fields including a field, wherein a field size of the field includes two or fewer bits and is based at least in part on a maximum quantity of bandwidth parts configured across each cell of the set of cells supported by the UE, and wherein respective bit values of the field indicate a respective set of parameters of the one or more sets of parameters for one or more cells of the set of cells; and
communicate one or more messages via at least one cell of the set of cells using the respective set of parameters for the at least one cell.

27. The apparatus of claim 26, wherein the instructions to monitor for the field of the downlink control information message are executable by the one or more processors to cause the apparatus to:
decode one or more bits of the field of the downlink control information message based at least in part on the field size, wherein the field size is based at least in part on a quantity of parameters associated with a set of parameters of the one or more sets of parameters.

28. The apparatus of claim 27, wherein the instructions are further executable by the one or more processors to cause the apparatus to:
determine the field size based at least in part on a cell of the set of cells, the cell associated with the set of parameters, wherein the quantity of parameters is greater than respective quantities of parameters for each remaining cell of the set of cells.

29. The apparatus of claim 27, wherein the instructions are further executable by the one or more processors to cause the apparatus to:
determine the field size based at least in part on a cell of the set of cells, the cell associated with the set of parameters, wherein the quantity of parameters is less than respective quantities of parameters for each remaining cell of the set of cells.

30. An apparatus for wireless communications, comprising:
one or more processors;
one or more memories coupled with the one or more processors; and
instructions stored in the one or more memories and executable by the one or more processors to cause the apparatus to:
transmit a configuration message indicating one or more sets of parameters for a set of cells supported by a user equipment (UE), the one or more sets of parameters indicating at least a respective quantity of bandwidth parts associated with each cell of the set of cells;
transmit a downlink control information message comprising a field via a cell of the set of cells based at least in part on the configuration message, wherein a field size of the field includes two or fewer bits and is based at least in part on a maximum quantity of bandwidth parts configured across each cell of the set of cells supported by the UE, and wherein respective bit values of the field indicate a respective set of parameters of the one or more sets of parameters for one or more cells of the set of cells; and communicate one or more messages via at least one cell of the set of cells using the respective set of parameters for the at least one cell.

\* \* \* \* \*